(12) United States Patent
Govardhan et al.

(10) Patent No.: US 11,358,087 B2
(45) Date of Patent: Jun. 14, 2022

(54) MULTIPLE BEAD AIR FILTER SEAL

(71) Applicant: GVS Filtration Inc., Findlay, OH (US)

(72) Inventors: Jayjeet Manik Govardhan, Eau Claire, WI (US); Nathan James Staves, Eau Claire, WI (US); Benjamin Joseph Rubenzer, Eau Claire, WI (US)

(73) Assignee: GVS Filtration Inc., Findlay, OH (US)

( * ) Notice: Subject to any disclaimer, the term of this patent is extended or adjusted under 35 U.S.C. 154(b) by 232 days.

(21) Appl. No.: 16/608,041

(22) PCT Filed: Apr. 25, 2018

(86) PCT No.: PCT/US2018/029432
§ 371 (c)(1),
(2) Date: Oct. 24, 2019

(87) PCT Pub. No.: WO2018/200719
PCT Pub. Date: Nov. 1, 2018

(65) Prior Publication Data
US 2020/0047105 A1    Feb. 13, 2020

Related U.S. Application Data

(60) Provisional application No. 62/490,102, filed on Apr. 26, 2017.

(51) Int. Cl.
*B01D 46/10*    (2006.01)
*B01D 46/24*    (2006.01)
(Continued)

(52) U.S. Cl.
CPC ......... *B01D 46/10* (2013.01); *B01D 46/2414* (2013.01); *B01D 46/52* (2013.01);
(Continued)

(58) Field of Classification Search
CPC .......... B01D 2271/02; B01D 2271/022; B01D 2271/025; B01D 2271/027; B01D 46/10;
(Continued)

(56) References Cited

U.S. PATENT DOCUMENTS 6,293,984 B1    9/2001  Oda et al.
2004/0194441 A1    10/2004  Kirsch
(Continued)

FOREIGN PATENT DOCUMENTS

CN    101668575 A    3/2010
CN    102119169 A    7/2011
(Continued)

OTHER PUBLICATIONS

International Search Report and Written Opinion dated Jun. 24, 2018.

*Primary Examiner* — Robert Clemente
(74) *Attorney, Agent, or Firm* — Dickinson Wright PLLC

(57) ABSTRACT

The present disclosure provides one filter with multiple standing compression seals that work together to seal against the mating filter housing assembly. The first compression bead design enables the second bead to seal against the Housing surface for maximum sealing performance for preventing unfiltered fluid from passing through a filter housing assembly.

19 Claims, 41 Drawing Sheets

(51) Int. Cl.
    *B01D 46/52*         (2006.01)
    *F16J 15/06*        (2006.01)

(52) U.S. Cl.
    CPC .. *B01D 2271/022* (2013.01); *B01D 2271/027* (2013.01); *F16J 15/064* (2013.01)

(58) Field of Classification Search
    CPC .. B01D 46/2414; B01D 46/52; B01D 46/521; F16J 15/064
    See application file for complete search history.

(56) References Cited

U.S. PATENT DOCUMENTS

| | | | |
|---|---|---|---|
| 2005/0229563 | A1* | 10/2005 | Holzmann ......... B01D 46/2414 55/502 |
| 2008/0041026 | A1* | 2/2008 | Engel ................... B01D 46/521 55/432 |
| 2008/0128993 | A1 | 6/2008 | Blakeley et al. |
| 2011/0167776 | A1 | 7/2011 | Georg et al. |
| 2014/0157736 | A1* | 6/2014 | Choi ...................... B01D 46/10 55/385.3 |
| 2014/0260144 | A1* | 9/2014 | Williams ........... B01D 46/2411 55/502 |
| 2016/0160816 | A1* | 6/2016 | Venkatraman ..... B01D 46/0005 55/502 |

FOREIGN PATENT DOCUMENTS

| | | |
|---|---|---|
| CN | 104275057 A | 1/2015 |
| CN | 105413321 A | 3/2016 |
| CN | 106039878 A | 10/2016 |
| CN | 106390626 A | 2/2017 |
| GB | 1253354 A | 11/1971 |
| JP | S47-003103 | 9/1972 |
| JP | 5037452 | 10/1975 |
| JP | S52-062752 | 5/1977 |
| JP | S57-122154 | 7/1982 |
| JP | 2002-516738 | 6/2002 |
| JP | 2005-324147 | 11/2005 |
| KR | 101675602 | 11/2016 |
| WO | WO9962618 | 12/1999 |

* cited by examiner

MULTIPLE BEAD AIR FILTER SEAL

RELATED APPLICATION

The present patent document is a nationalization of PCT/US2018/029432, filed Apr. 25, 2018, which claims the benefit of the filing date under 35 U.S.C. § 119(e) of Provisional U.S. Patent Application Ser. No. 62/490,102, filed Apr. 26, 2017, which is hereby incorporated by reference.

TECHNICAL FIELD

The present disclosure relates generally to the sealing of air filters inside housings, and more particularly to the use of multiple compression seal structures on the perimeter of the air filter used to compress against the filter housing and work in tandem to protect against housing air and dust leakage across a joint or opening in an assembly or housing.

BACKGROUND

Filter housings consist primarily of two sections, upper and lower, with a filter installed and mechanically sealed between the housing sections. A mechanical seal is a device that helps join systems or mechanisms together by preventing leakage. A compressible seal is attached with the filter media and the seal is used to compress against the housing and prevent unfiltered liquid from passing through the joint of the housing. U.S. Pat. No. 5,295,602 references a filter housing with snap latch closure and is incorporated herein by reference in its entirety.

In operation, the compression force exerted by the seal onto the housing surface ensures a positive seal, preventing unfiltered fluid from passing through the sealing joint. We have discovered that current joint designs are somewhat limited in their ability to completely seal against the housing surface. Incomplete sealing can allow for unfiltered fluid to pass through the joint and cause potential damage to the system that the filter is designed to protect. The filter functions to remove dust particle and debris from the air stream to protect the downstream system from damage that can occur from the dust and debris.

To manufacture the filter, generally the filter media is folded into pleats in an accordion style and a flexible gasket material is molded to or adhered to the edges of the filter media to create a flexible sealing structure around the perimeter of the filter media for installation and sealing to the housing. When the flexible gasket material used as the sealing feature is manufactured around the filter media the sealing material requires curing time to stabilize and set the material into shape. We have found that insufficient curing time can create voids of missing material on the sealing surface. A void is an area in the seal cross section or on the surface where there is an absence of material; an area devoid of materials where it was intended to have material. In addition we have found that the gasket material may have pockets of air that can create voids or missing areas of material on and in the flexible gasket sealing surface. Missing areas of material are voids that occur at the sealing edge and can provide a bypass path to allow for unfiltered air to pass through the joint.

In addition to voids in the seal surface, we have further discovered that uneven pressing force on the circumference of the sealing surface can cause gaps in the seal and create leakage paths for unfiltered air. Uneven pressing force is caused by a variety of factors, including asymmetric forces holding the housing closed and unequal torque on the closure mechanism holding the two sections of the housing together. With an asymmetrical housing the forces around the sealing perimeter are unequal and can cause asymmetrical deformation of the sealing surface. The seal pressing force is reduced in some areas, thus being prone to leakage areas for unfiltered air.

To compensate, some designs use two identical redundant seals. This increases the probability of obtaining a complete seal surface, however we have discovered that it does not correct for voids in the sealing surface and cannot stop leakage when both the redundant identical seals have voids at the sealing surface or are unevenly compressed.

SUMMARY

The present disclosure relates generally to the use of multiple compression seal features incorporated on the filter to seal against the enclosed housing surface and function together to improve the sealing. In application to an air filter, the present disclosure ensures unfiltered air does not penetrate through the joint created at the sealing structure. The filter functions to ensure air and dust will flow to the filtration media surface where the filtration media blocks a portion of the dust from traveling from the inlet of the housing to the outlet of the housing. The outlet of the housing being upstream from the engine or other components that the filter is protecting from damage caused by dust particles. While generally described herein for air filters, the present disclosure can be applied to a filter used in any fluid; such as liquids or air.

The present disclosure incorporates a multiple sealing bead design along with interaction between the two sealing beads to compensate for voids on the sealing surface, to avoid collapse and to compensate for uneven compressive forces. The present disclosure discloses use of two or more sealing beads or raised protrusions with at least two beads having dissimilar heights to work in tandem to create a robust seal surface and overcome filter failures from voids in the seal and from uneven compression.

The sealing beads are incorporated into the gasket formed around filter media. The gasket material can be formed around the filter media using a molding or other adhering process. The filter media is what the air flow through to remove debris from the air stream. The gasket and sealing beads are designed with compression control by defining ideal and specific stiffness, geometry, tightness and compressibility properties and uniquely shaped compression element (s) with variable thickness and height for specific mechanical properties.

In the present disclosure the shorter first sealing bead is able to significantly affect and control the bending of the second taller sealing bead to avoid collapse or movement of the seal bead during air flow and compression. Interactions between the shorter and taller sealing beads provide a larger sealing surface and eliminates leakage from voids in the seal and from uneven housing compression. The multiple bead design also allows for easier, faster and more uniform assembly of the joint.

BRIEF DESCRIPTION OF THE DRAWINGS

FIG. 1 is a view of the current art in a cylindrical element filter using a single sealing bead.

FIG. 2 is an enlarged, fragmentary sectional view of the current art in FIG. 1.

FIG. 3 is an exploded view of an air filter housing assembly using a flat panel filter.

FIG. 4 is a sectional view of the air filter housing assembly in FIG. 3 showing a flat panel filter inside an air filter housing assembly.

FIG. 5 is a sectional view of FIG. 4 with two identical sealing beads prior to compression.

FIG. 6 is a sectional view of FIG. 4 with two identical sealing beads under compression.

DETAILED DESCRIPTION

Figure 1:
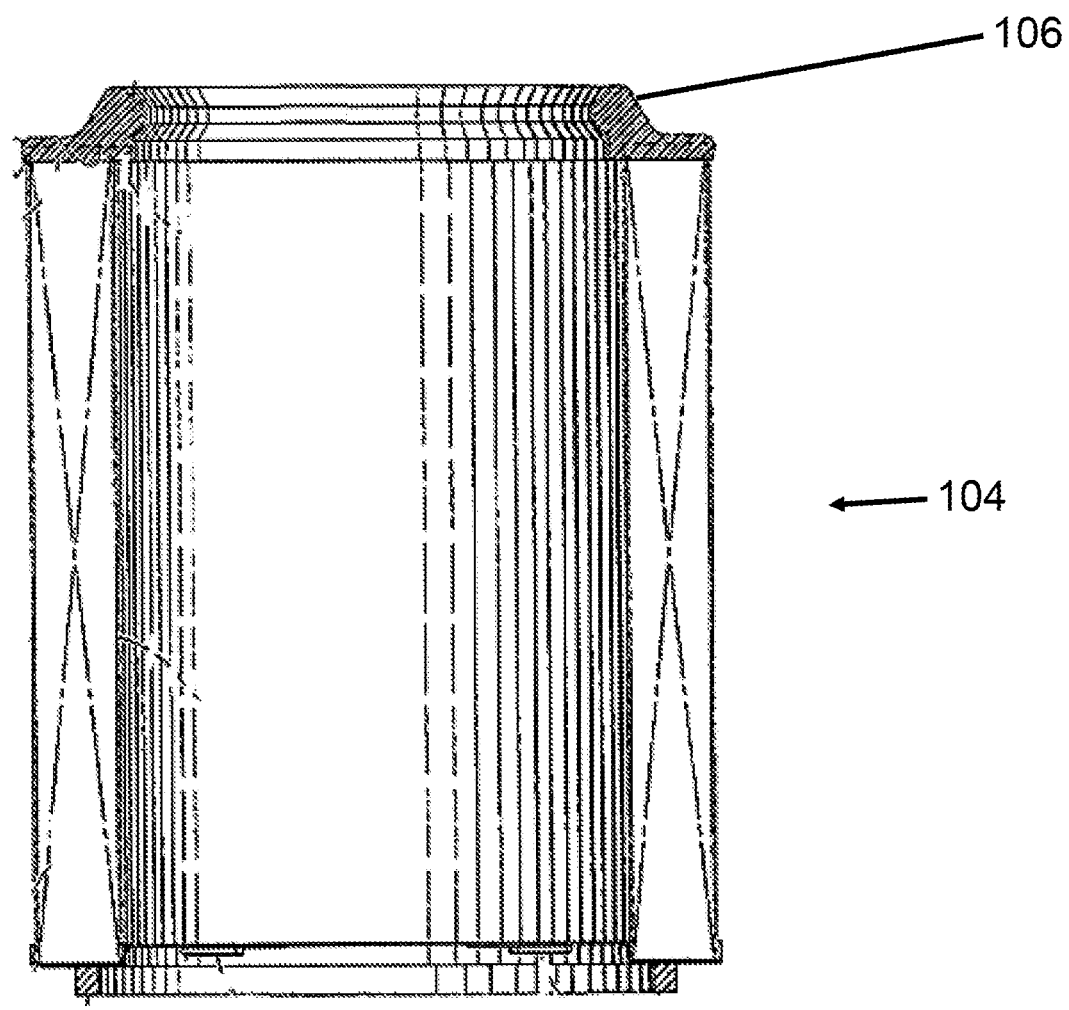
FIG. 1 thru FIG. 6 show prior art filter designs.

All figures serve illustrative purposes only and are not intended to limit the scope of the present disclosure. The drawings are generally to scale, but some features may not be true to scale and serve to emphasize certain details of the various aspects of the disclosure. Common items between different embodiments in the figures have common reference numerals. Although generally described herein for air filters, the present disclosure can be applied to a filter used in any fluid; such as liquids or air.

Figure 2:
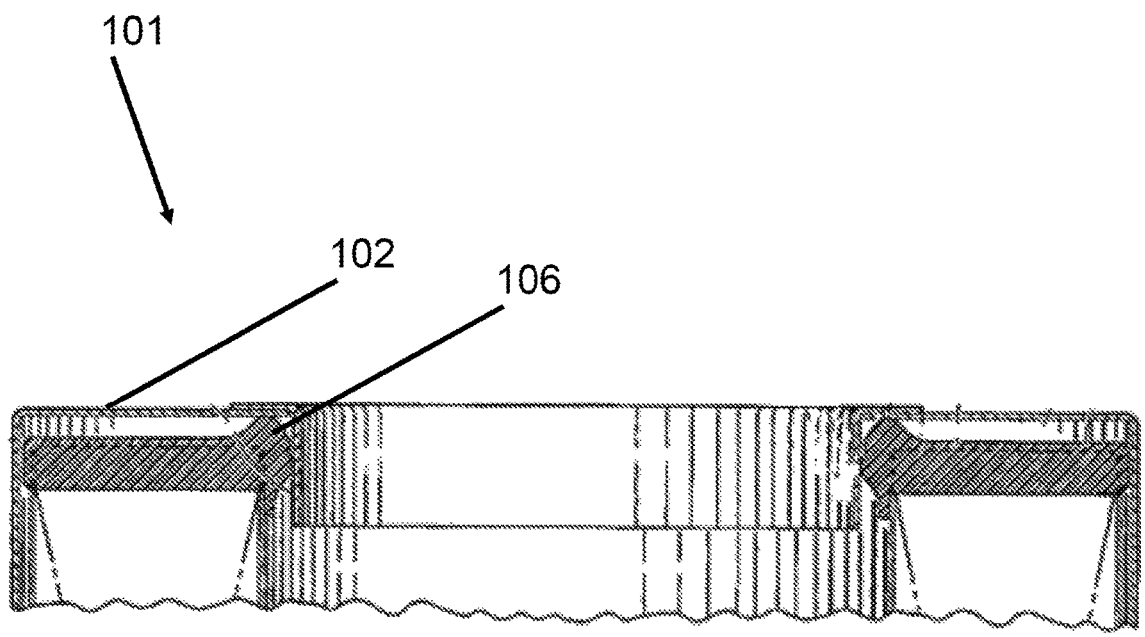

FIGS. 1 and 2 generally depict prior art designs of filters using single bead or blade seal designs.

FIG. 1 shows a prior art cylindrical filter element (104) designed to install in a cylindrical housing. FIG. 2 shows a sectional view of a Filter Housing Assembly (101) using the cylindrical filter element (104) of FIG. 1. The current state of the art is using one surface shaped as a bead or curved section to compress the single seal bead (106) against the upper housing (102).

Figure 3:
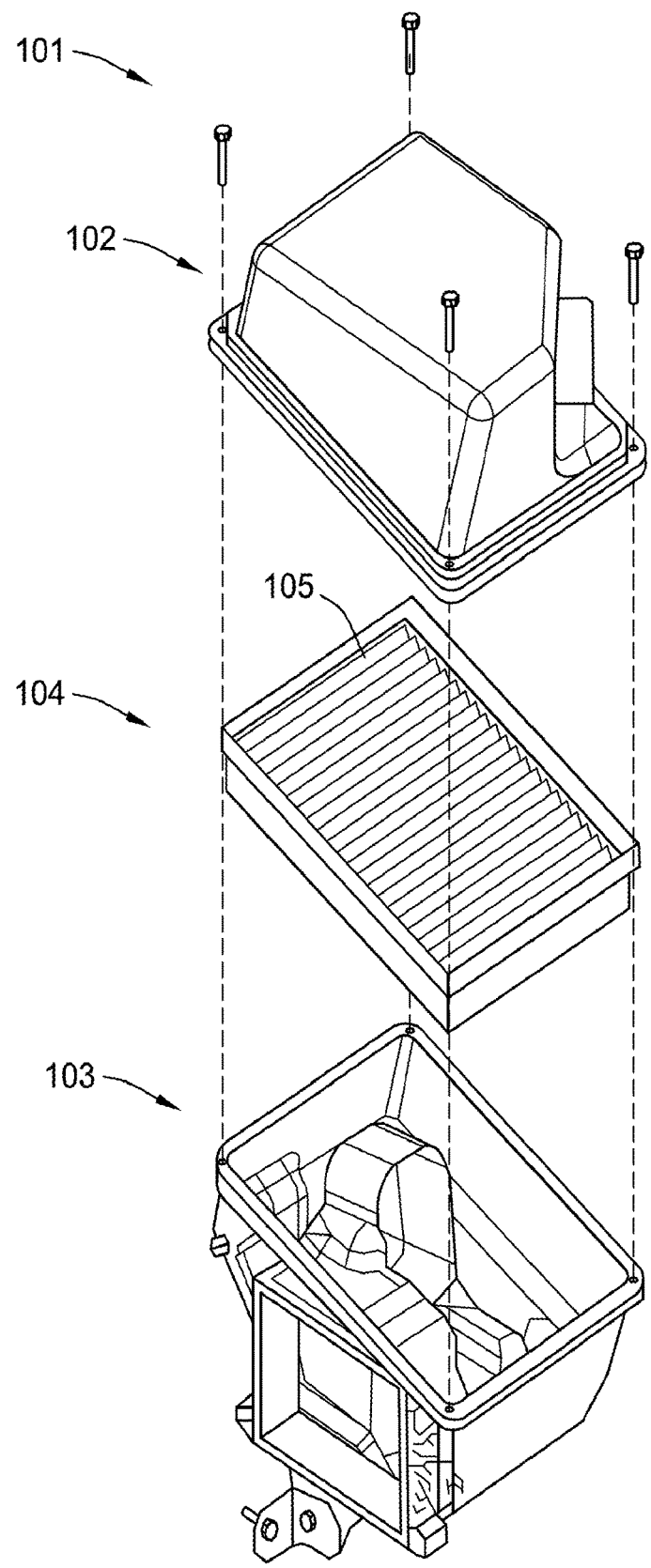

FIG. 3 shows an exploded view of a Filter Housing Assembly (101) showing the Upper Housing (102), the Flat Panel Filter (104) and the Lower Housing (103) as they are assembled together. The filter is installed into the housing and compressed between the Upper Housing (102) and Lower Housing (103) by applying pressure to the Filter Body Gasket (105) which extends around the perimeter of the filter.

The filter of FIG. 3 is compressed between the two housing units (102)(103). The housing is often not symmetrical in shape and the compressive forces applied to the Filter Body Gasket (105) around the perimeter of the filter are not equal. This can cause areas around the filter where the force compressing the seal is not sufficient to create a barrier to air flow or other fluid flow. Uneven pressing force on the perimeter of the sealing surface can cause gaps in the seal and create leakage paths for unfiltered air.

Figure 4:
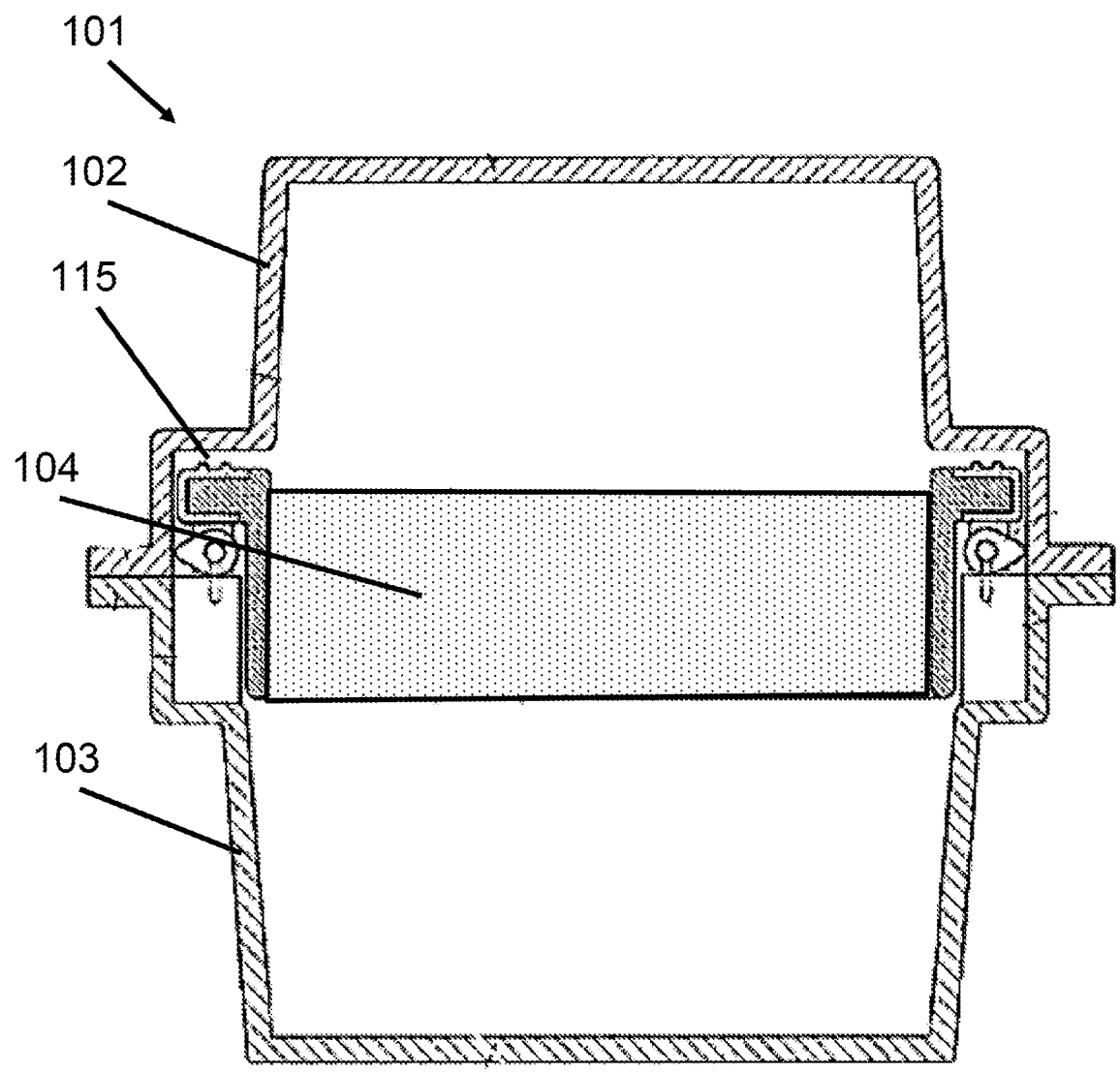
Figure 5:
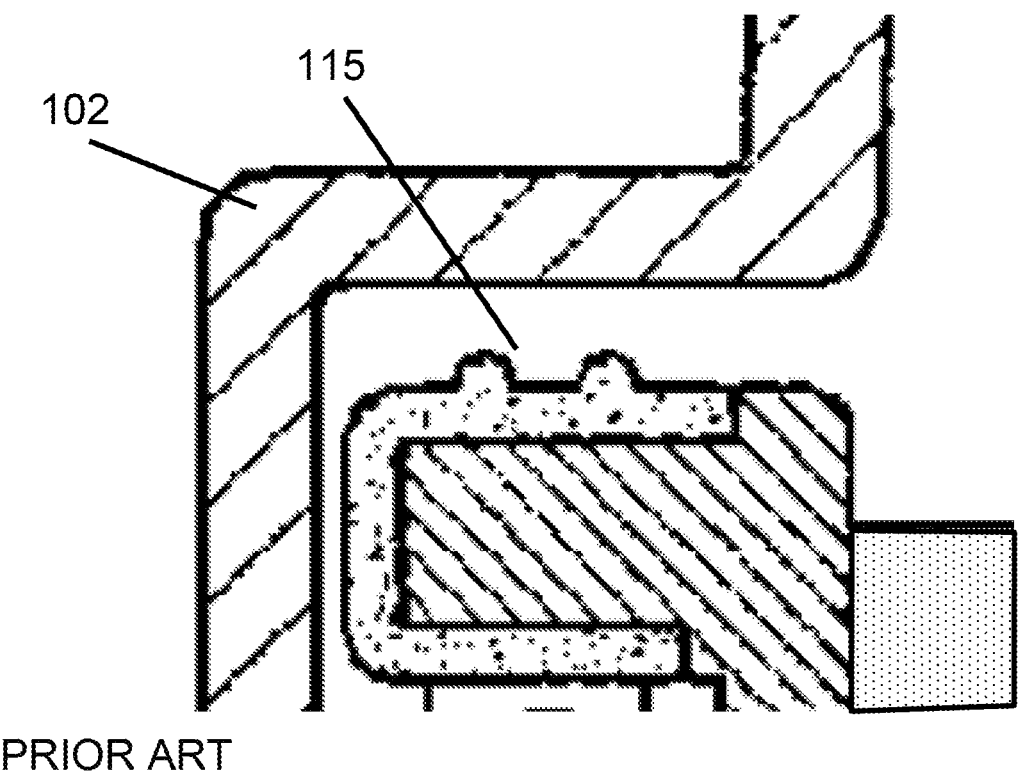
Figure 6:
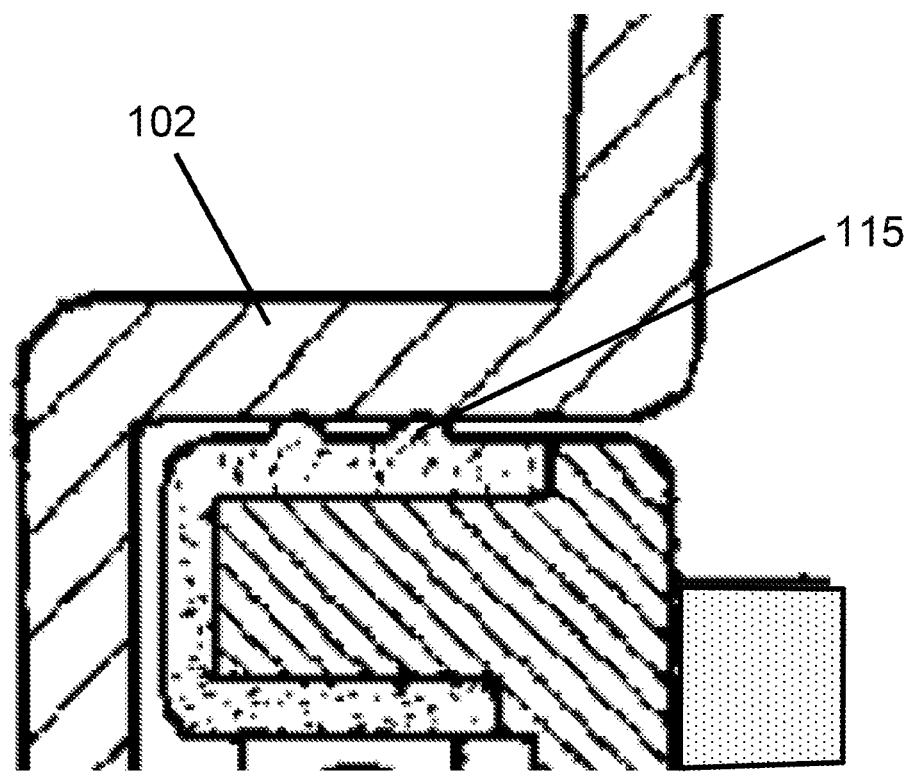

With one bead contacting the housing, as in FIG. 2, any material voids or unevenness in the compressive forces around the perimeter of the filter can create a path for unfiltered air to pass through. Past attempts have been made to eliminate leakage around the single seals by adding a second identical bead beside the first bead. FIGS. 4 thru 6 show one attempt using two identical sealing beads.

FIG. 4 shows the sectional view of the filter housing assembly (101) with flat panel filter (104) using two identical sealing beads (115). A close up view of the beads in an uncompressed state are shown in FIG. 5. FIG. 6 shows the compressive forces on the two identical sealing beads (115) of FIG. 4. The two identical sealing beads (115) compress in equal amounts when subjected to the compressive force in the localized areas around the perimeter of the filter. We have discovered that compressive forces may not be equally distributed around the perimeter and still allow for areas where the seal is not sufficiently compressed to provide a barrier for leakage of unfiltered air. That is, areas around the perimeter where the force compressing the seal is not sufficient to create a barrier to air flow will affect both beads equally and allow for leakage paths for unfiltered air. When voids are present in both seals there exists a pathway for passage of unfiltered air. We have found that this identical two bead design does not correct leakage of unfiltered air due to material voids in the seal surface or due to unevenness in the compressive forces on the housing that act as the force on the filter body gasket (105) around the perimeter of the filter.

The present disclosure overcomes leakage of unfiltered air due to material voids in the seal surface and unevenness in compressive forces around the perimeter of the filter.

Figure 7:
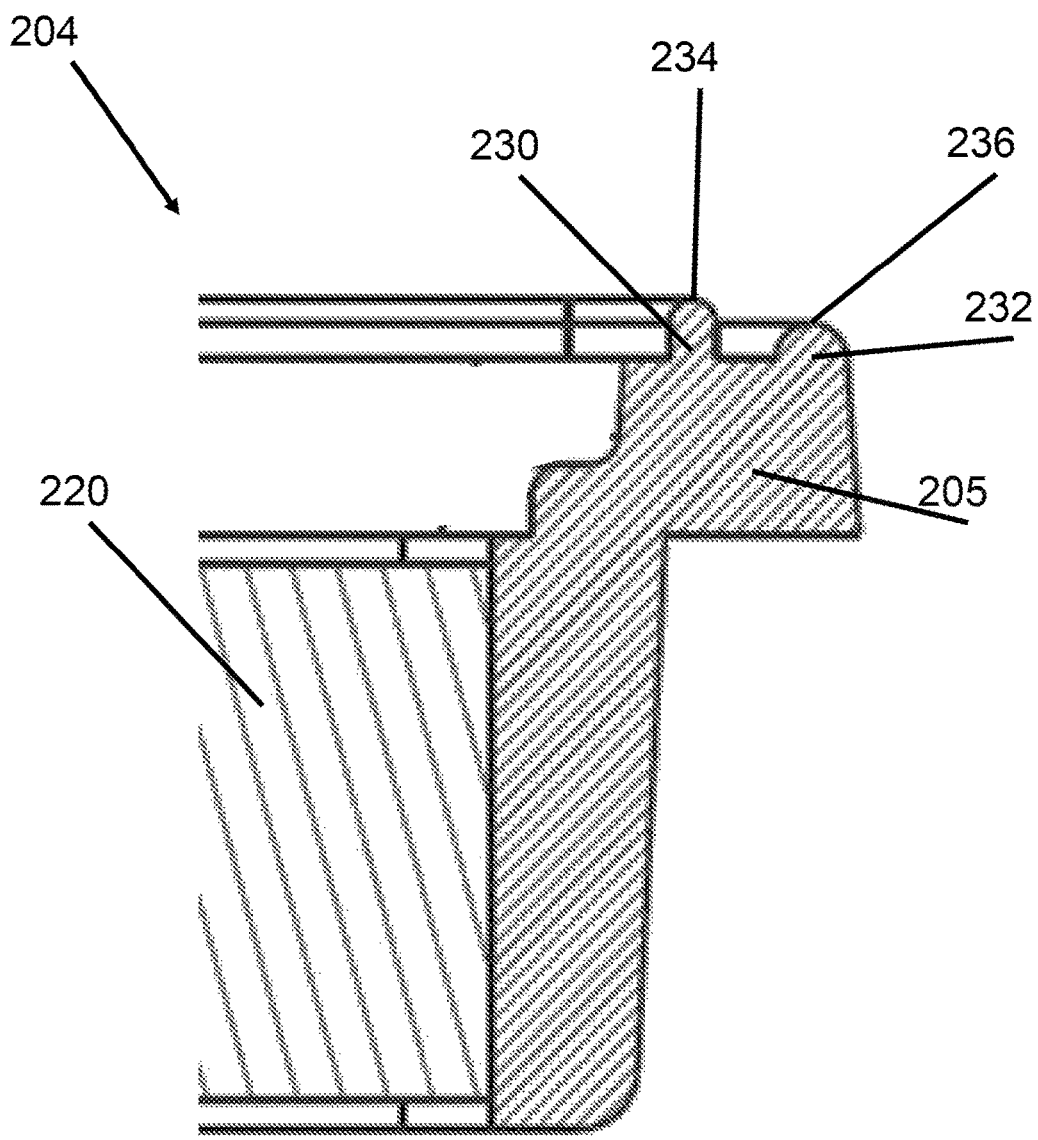
FIG. 7 shows the present disclosure in a sectional view of a flat panel filter and the presence of two seal beads of unequal height.

One embodiment of the present disclosure is shown in FIG. 7. This is a cross-sectional view of the flat panel filter (204) shown in FIG. 8. The perimeter seal on the filter body uses two beads (230)(232) of different heights relative to a common horizontal axis or plane (e.g. generally parallel to a surface of the filter frame and/or the sealing surface(s) of upper or lower housing parts) in proximity to each other. In particular, the present disclosure presents a perimeter seal with a tall sealing bead (230) and a short sealing bead (232). This embodiment of the flat panel filter (204) with seal filter body gasket (205) and unequal height seal features (230)(232) is intended to install into a Filter Housing Assembly (201) as in FIG. 9.

Figure 8:
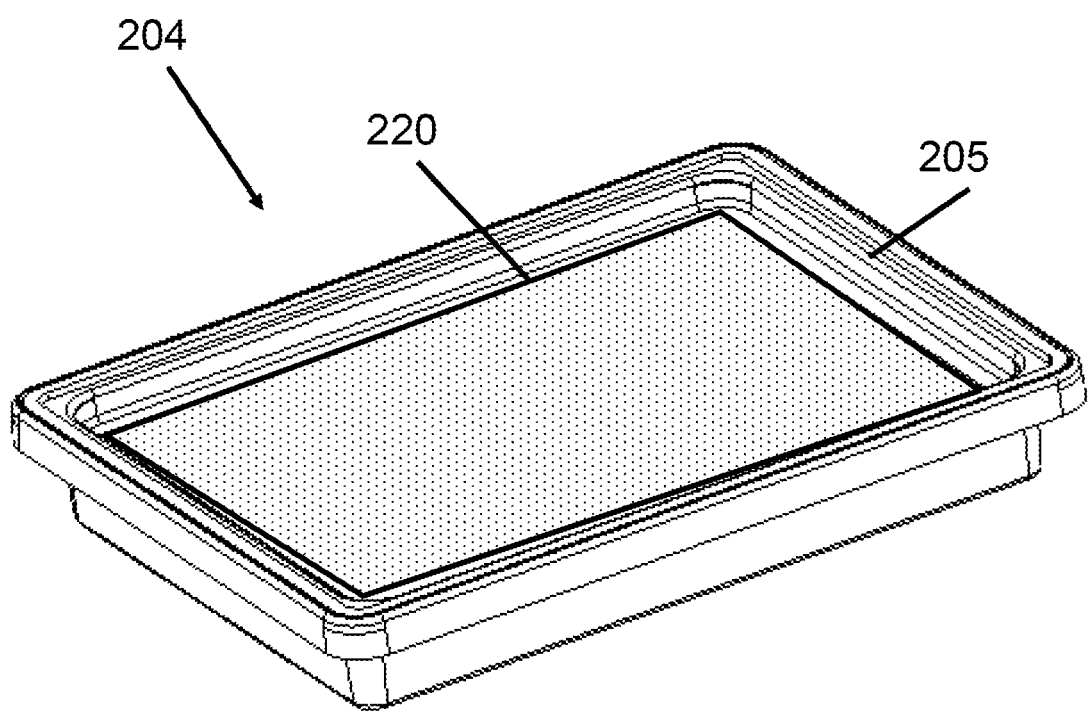
FIG. 8 is an isometric view of the flat panel filter.
Figure 9:
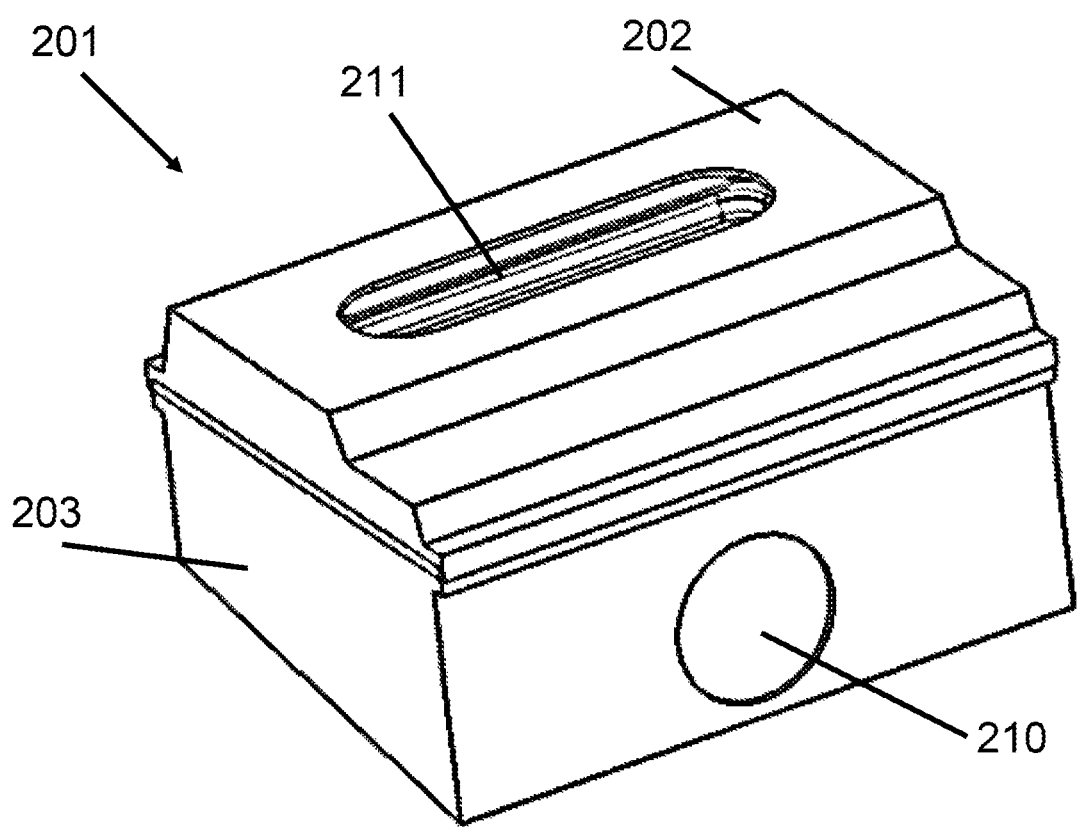
FIG. 9 is an isometric view of a filter housing assembly.

In one implementation, the present disclosure comprises a flat panel filter (204) with a filter body gasket (205) around the perimeter of the pleated filter media (220). As shown in FIG. 9, the flat panel filter (204) as shown in FIG. 8 installs into the filter housing assembly (201) between the upper housing (202) and lower housing (203). Air flows into the filter housing assembly (201) through an inlet for air flow (210). The air stream flows through the flat panel filter (204) and filtered air exits through the outlet (211). Per FIG. 7, included on the filter body gasket (205) are two protrusions of beads of compressible material (230)(232) with engagement surfaces of the seals (234,236) to make first contact to the housing surface (202). The flat panel filter (204) located at the interface between the two housing portions (202)(203) shown in FIG. 10 and installed with the seal surfaces (234)(236) against the housing surface (202). These two beads (230)(232) are of dissimilar heights relative to the surface of the housing against which they press to create a seal. The sealing beads (230)(232) have an uncompressed configuration with uncompressed height and a compressed configuration where the height is altered by the force of the housing onto the sealing bead. The engagement surfaces of the seals (234,236) make first contact to the housing surface (202).

The filter body gasket (205) refers to the holding portion of the filter media (220). This is typically compressible for an air filter but can be in a solid form like a plastic or metal. The sealing bead (230)(232) refers to portions of the filter body gasket (205) or other sections attached to the filter body that are used to press and seal against the surface of the housing (202). The sealing bead material is preferably a compressible rubber-like device that when squeezed between two surfaces forms a static seal. The sealing material can be made from homogeneous rubber, fabric reinforced rubber, fibrous materials with rubber binders, nitrile, silicone, polyurethane, urethane, flexible graphite, PTFE and other similar compressible materials.

For the design of the filter body gasket (205) and the seals (230)(232), there are variations in cross-section design, in height thickness and in shape. The engagement surfaces of the seal (234,236) are what comes in contact with the housing surface and are generally designed to ensure the seals can rest fully against the surface of the housing (202) and create a full contact surface to prevent air leakage.

The softness of the compressible seal material determines the pliability and compressive reaction of the material. Softness is measured on a hardness scale and defined in units of durometer of the material. For the compressible seals on the filter body gasket, according to the present disclosure, the durometer ranges from approximately 20 to 70 Shore A, preferably 50 to 60 Shore A.

Figure 10:
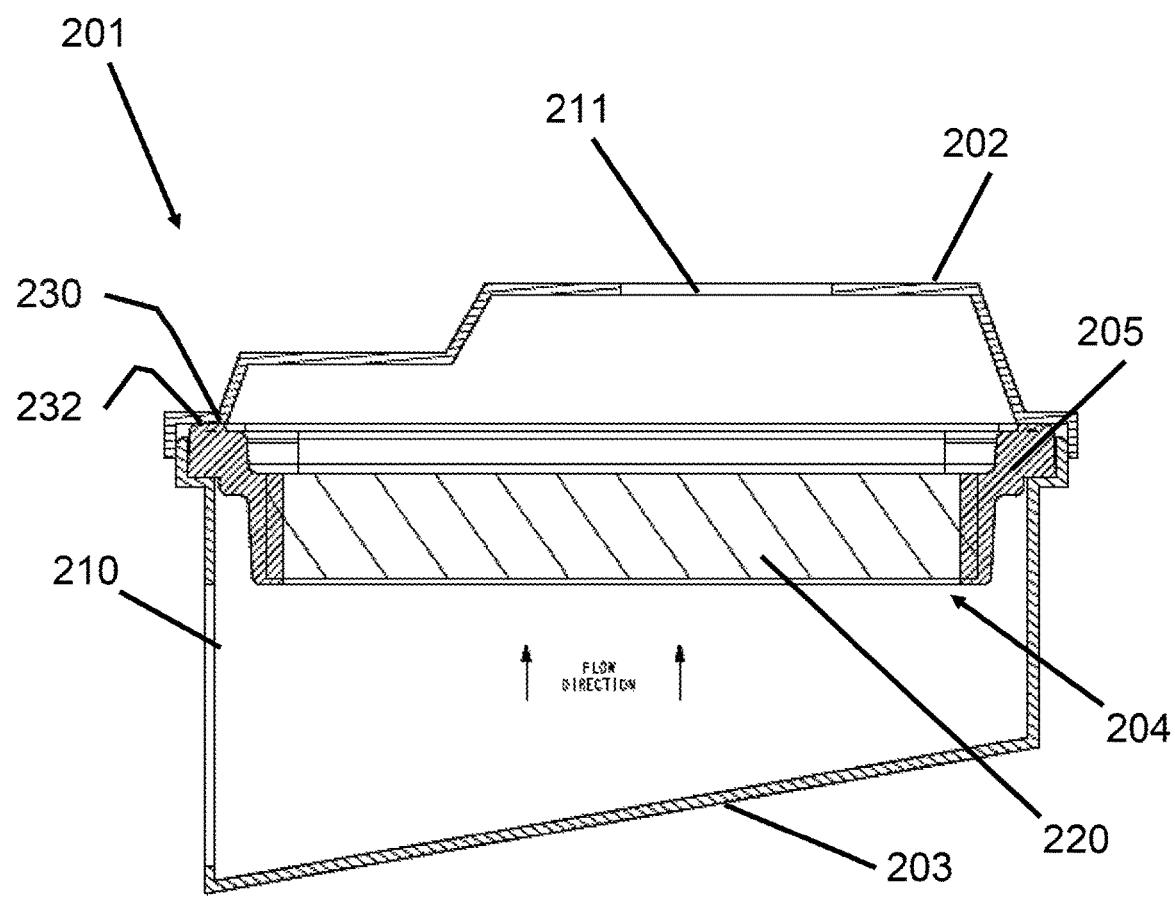
FIG. 10 is a sectional view of the air filter housing assembly in FIG. 9, showing the Flat Panel filter installed inside the filter housing assembly.

A sectional view of the filter housing assembly (201) in FIG. 10 shows the filter installed with the filter body gasket (205) compressed between the upper housing (202) and the lower housing (203).

Figure 13:
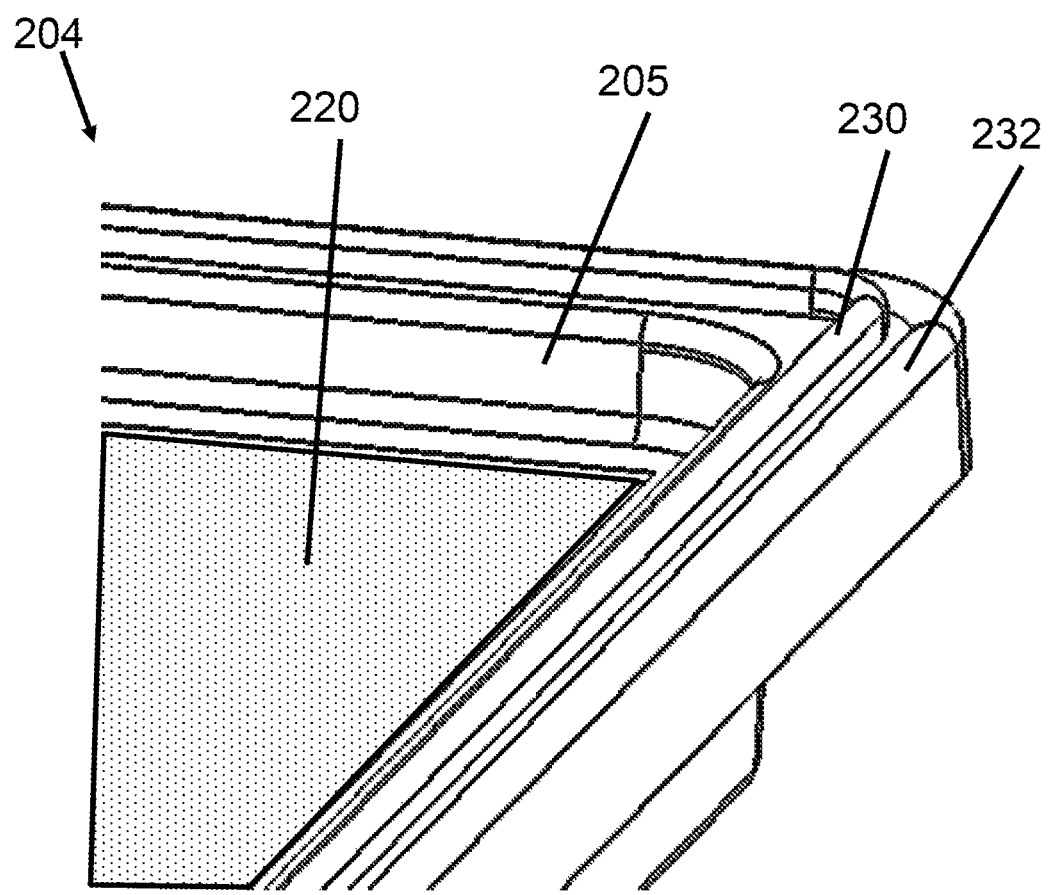
FIG. 13 shows a close up isometric view of the dual seal beads on the filter body gasket around the perimeter of the flat panel filter of FIG. 8.

Two sealing beads (230)(232) of unequal height, shown in FIGS. 7 and 13, are located on the upper surface of the filter body gasket (205) of the flat panel filter (204) and are used to compress against the upper housing (202). The short sealing bead (232) is located beside a tall sealing bead (230). The present disclosure incorporates a multiple sealing bead design along with interaction between the two sealing beads to compensate for voids on the sealing surface, to avoid collapse and to ensure even compressive forces. The present disclosure discloses using one or more short sealing bead (232) and one or more tall sealing bead (230) to work in tandem to create a robust seal surface and overcome filter failures from voids in the seal and from uneven compression. The sealing beads are incorporated into the flexible gasket formed around the filter media (220).

Figure 11:
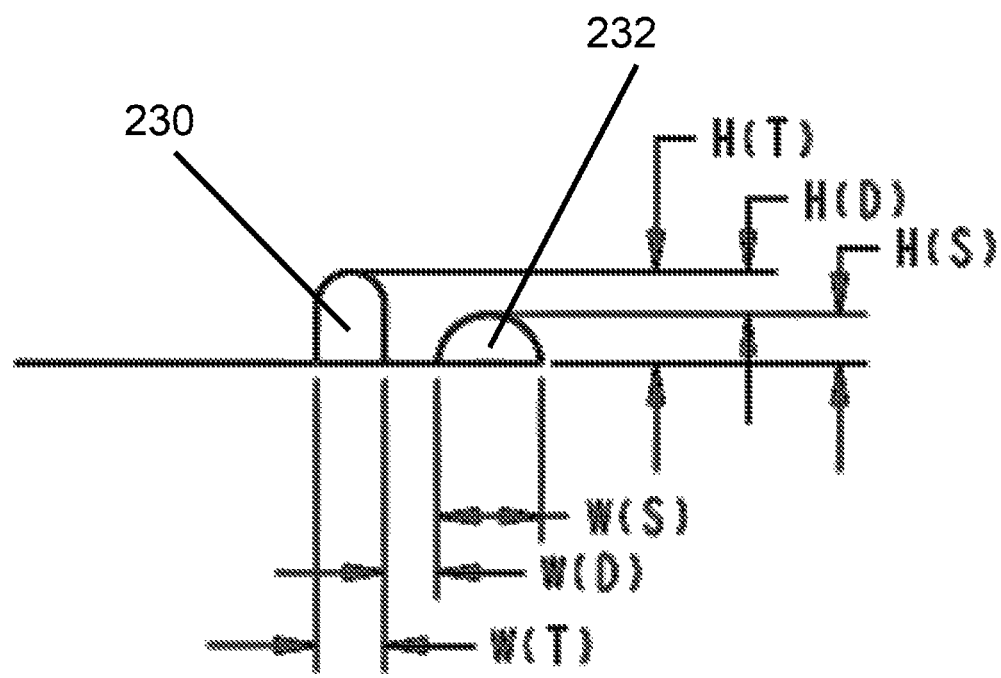
FIG. 11 shows the two unequal height beads side by side with dimensional labels.

FIG. 11 shows a diagram of the tall sealing bead (230) and the shorter sealing bead (232) and distance labels for their relative heights, widths and distance. The distance W(D) between the two seals is generally 30% to 80% smaller than the height H(T) of the tall sealing bead (230). The Height H(T) of the taller sealing bead (230) is generally 30% to 60% larger than the height H(S) of the shorter sealing bead (232). The taller bead (230) has a width-to-height ratio that allows for rolling and/or folding of the tall sealing bead (230), and is preferably structured for movement towards the short sealing bead (232). The ratio of the width W(T) to the Height H(T) is recommended from 1:1 up to 1:7 to allow for rolling and folding of the tall sealing bead (230). For the short sealing bead (232), the ratio of the width W(S) to the Height H(S) is recommended from 2:1 up to 1:3 to allow for stability and compression of the shorter sealing bead (232).

In the current embodiment of disclosure in a flat panel filter (204), the height of the short sealing bead (232) may vary from approximately 0.75 mm to 7 mm, preferably from 1.0 mm to 3.0 mm. The height of the tall sealing bead (230) may vary from approximately 1.25 mm to 10 mm, preferably from 1.5 mm to 4.5 mm. The difference in height between the short sealing bead (232) and the tall sealing bead (230) ranges from 0.25 mm to 5 mm, and preferably from 0.5 mm to 2.5 mm. In this embodiment the distance between the closest sides of the two beads is recommended to vary from approximately 0.5 mm to 4 mm. The width of the short sealing bead (232) may vary from approximately 1.5 mm to 5 mm and the width of the tall sealing bead (230) may vary from approximately 1.5 mm to 5 mm.

Figure 12:
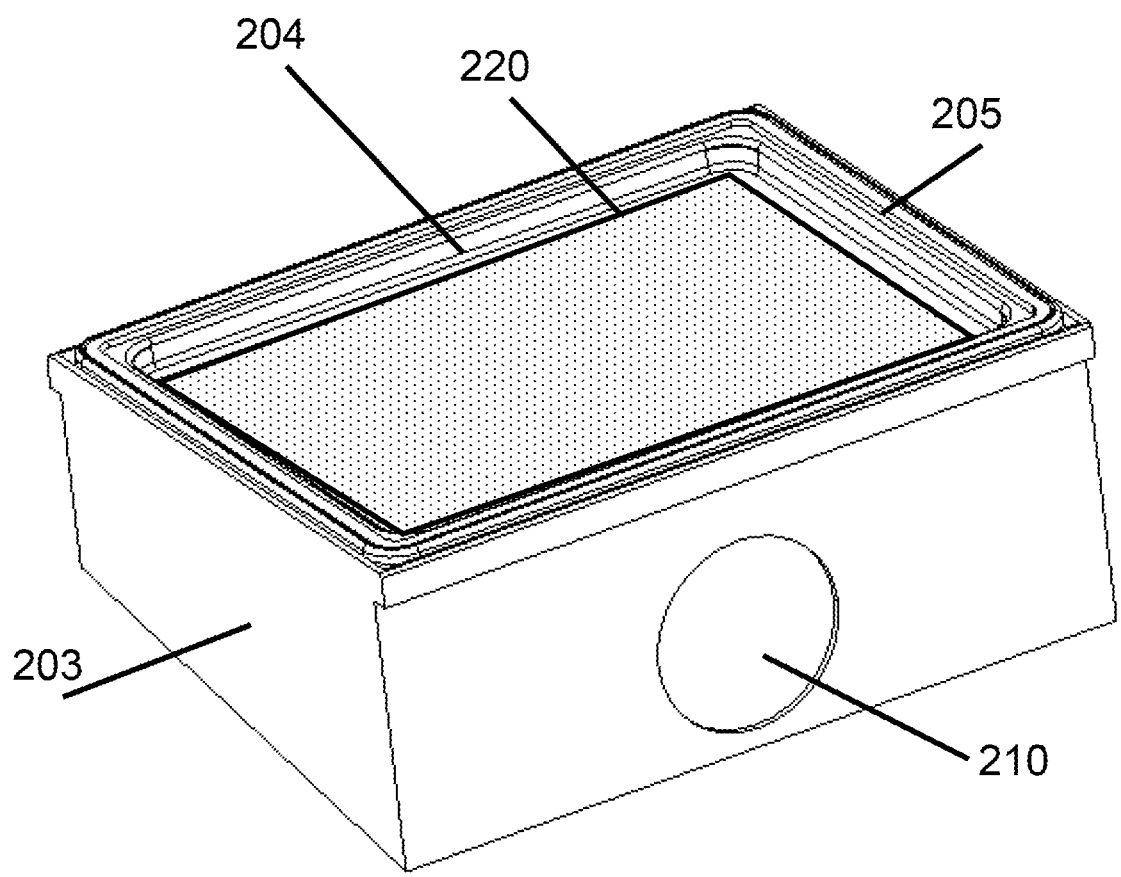
FIG. 12 is an isometric view of the flat panel filter installed into the lower housing.

The installation of the filter is into the two sides of the housing. FIG. 12 shows the filter installed into the lower housing (203) and FIG. 8 shows the flat panel filter (204) without housing. The flat panel filter (204) is shown in magnified sectioned view in FIG. 13. The filter is installed into the housing to compress the filter body gasket (205). Two dissimilar protruding beads are used, the tall sealing bead (230) and the short sealing bead (232). Sealing and compression forces are exerted on the filter body gasket (205) causing the tall sealing bead (230) and short sealing bead (232) to compress and deform. These two beads interact together to create a robust seal that blocks the flow of unfiltered air and air leakage past this seal area.

When force is applied to the tall bead it can roll to the left, right or compress onto itself. The tall sealing bead (230) will roll depending on the structure of the housing surface and the symmetry or asymmetry of the bead structure. Preferably the tall bead (and/or the housing) is structured to cause the taller bead (230) to roll toward the short sealing bead (232) and interact to create a larger surface area for sealing. Use of an asymmetric tall bead or a ramp or angle on the housing surface can be used to guide the tall bead to roll toward the short bead.

When squeezed upon installation, the tall sealing bead (230) shifts or rolls horizontally left or right and creates solid contact surfaces to the upper housing (202) and to the short sealing bead (232). This creates wider contact with the housing, a greater surface area in compressive contact, and greater resistance for air leakage. To prevent leakage caused by uneven pressing force the shorter second seal bead (232) provides a stop control point and limits the distortion of the tall sealing bead (230) that could be caused by over compression or excessive high forces exerted by the housing onto the beads.

Figure 20:
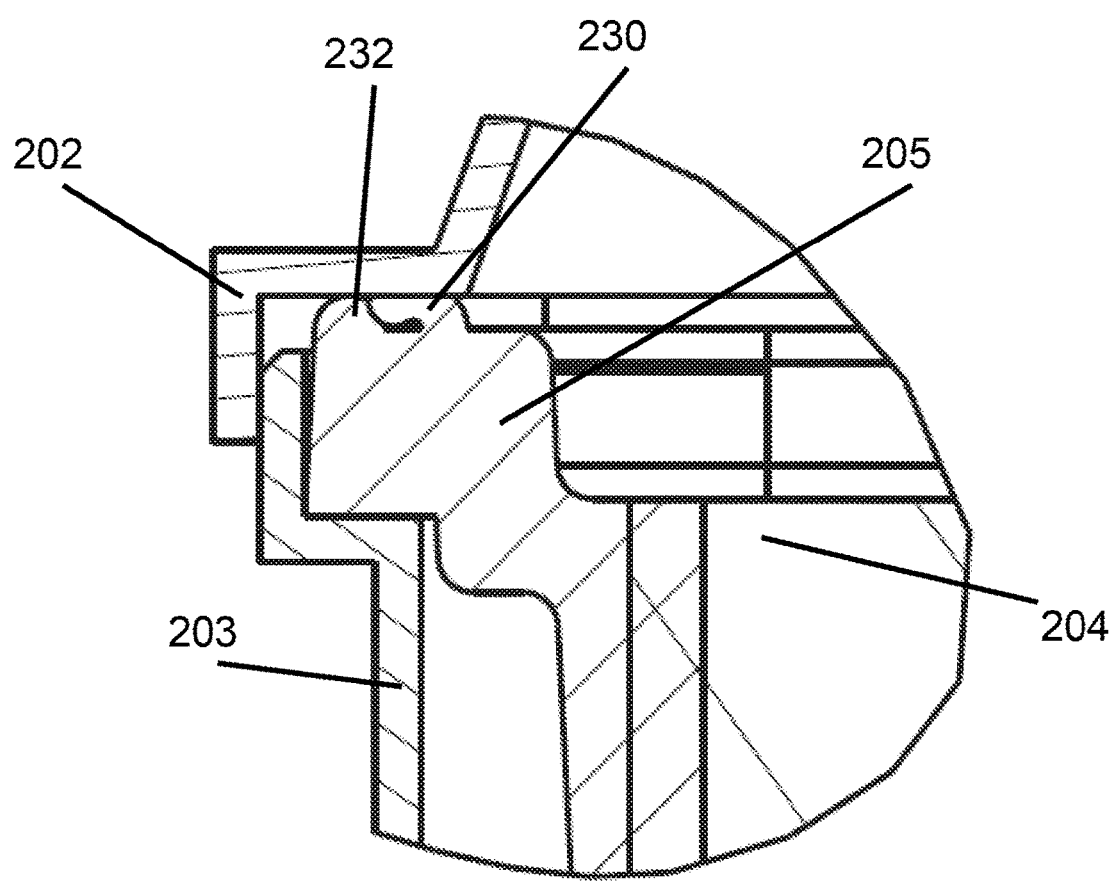
FIG. 20 is a sectional close up view of the air filter housing assembly with the upper housing and lower housing completely engaged in full assembly position and the seals shown under full compression.

The tall sealing bead (230) is taller than the short sealing bead (232) and both work in tandem to compress as the tall sealing bead (23) compresses and shifts sideways to create a larger sealing surface to the upper housing (202). Both seals undergo compression as the upper housing (202) and lower housing (203) are brought together as the filter housing assembly is fully assembled under full compression on the seals as shown in FIG. 20.

The progression of the effects of force onto the seals as the housing is assembled is shown in FIG. 14 through 20.

Figure 14:
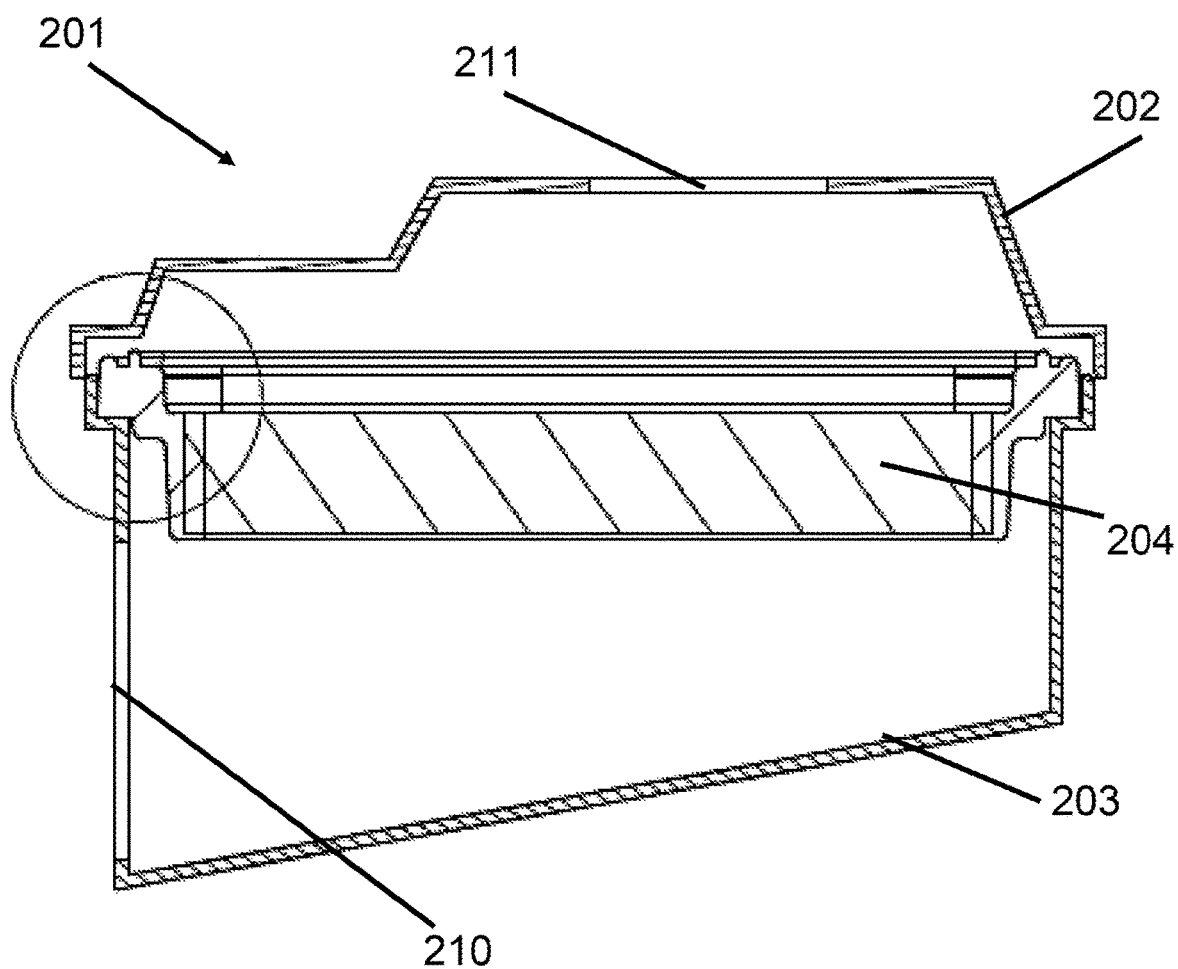
FIG. 14 is a sectional view of the air filter housing assembly with the upper housing and lower housing separated to show the positioning of the gasket prior to assembly of the upper housing and lower housing.
Figure 15:
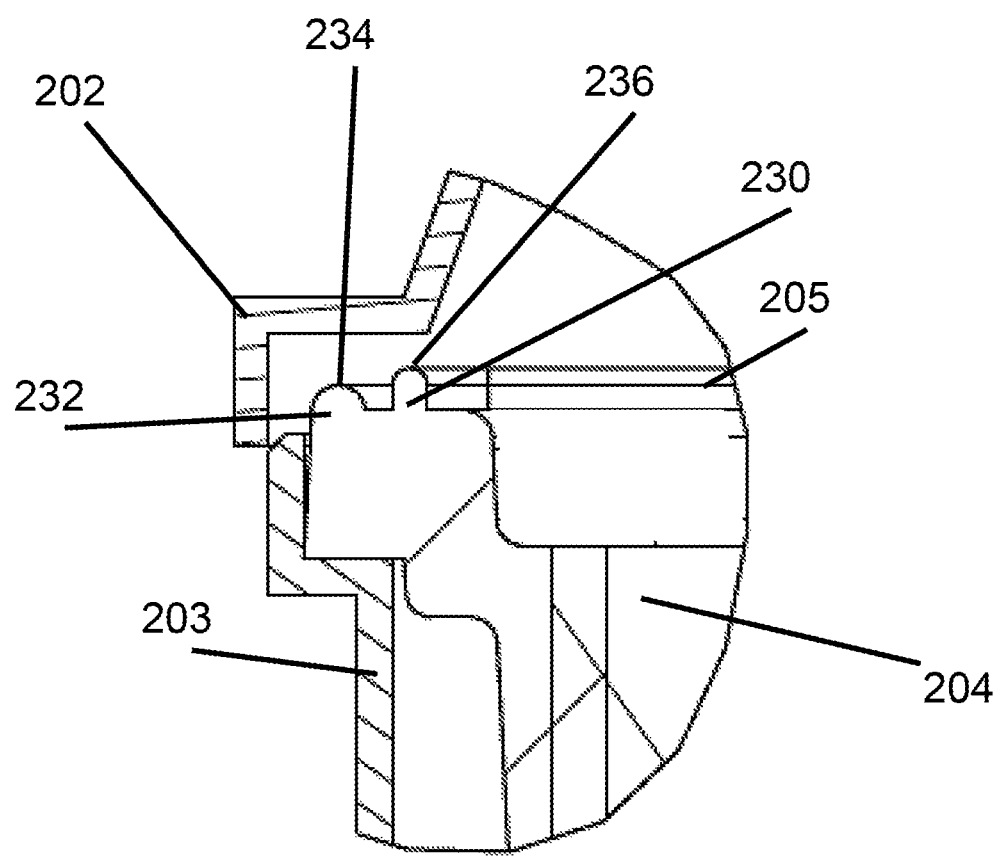
FIG. 15 is a sectional close up view of the sealing area of FIG. 14.

FIG. 14 and FIG. 15, show the upper housing (202) and lower housing (203) separated to show the positioning of the gasket prior to assembly of the upper housing (202) and lower housing (203).

As the upper housing (202) and lower housing are brought together into assembly, the filter body gasket (205) undergoes compressive forces that compress the sealing beads.

Figure 16:
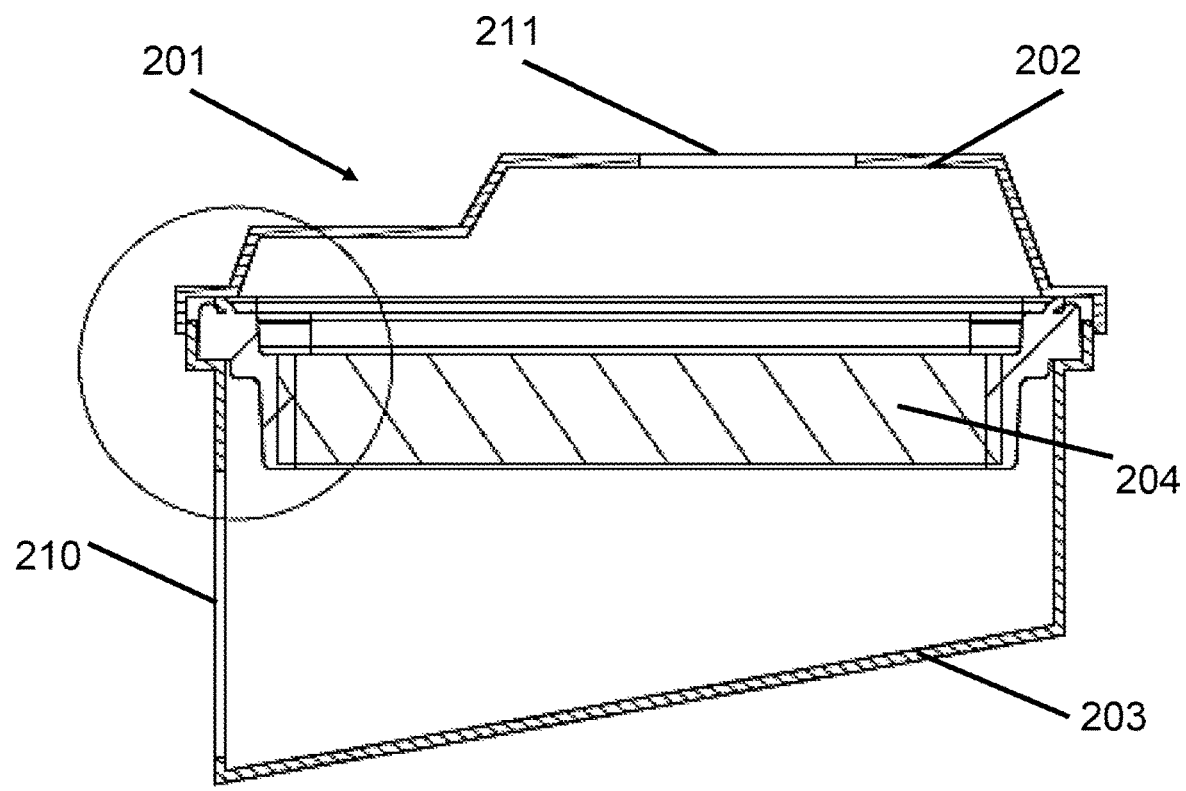
FIG. 16 is a sectional view of the air filter housing assembly with the upper housing and lower housing beginning to close together and the tall seal beginning initial compression.
Figure 17:
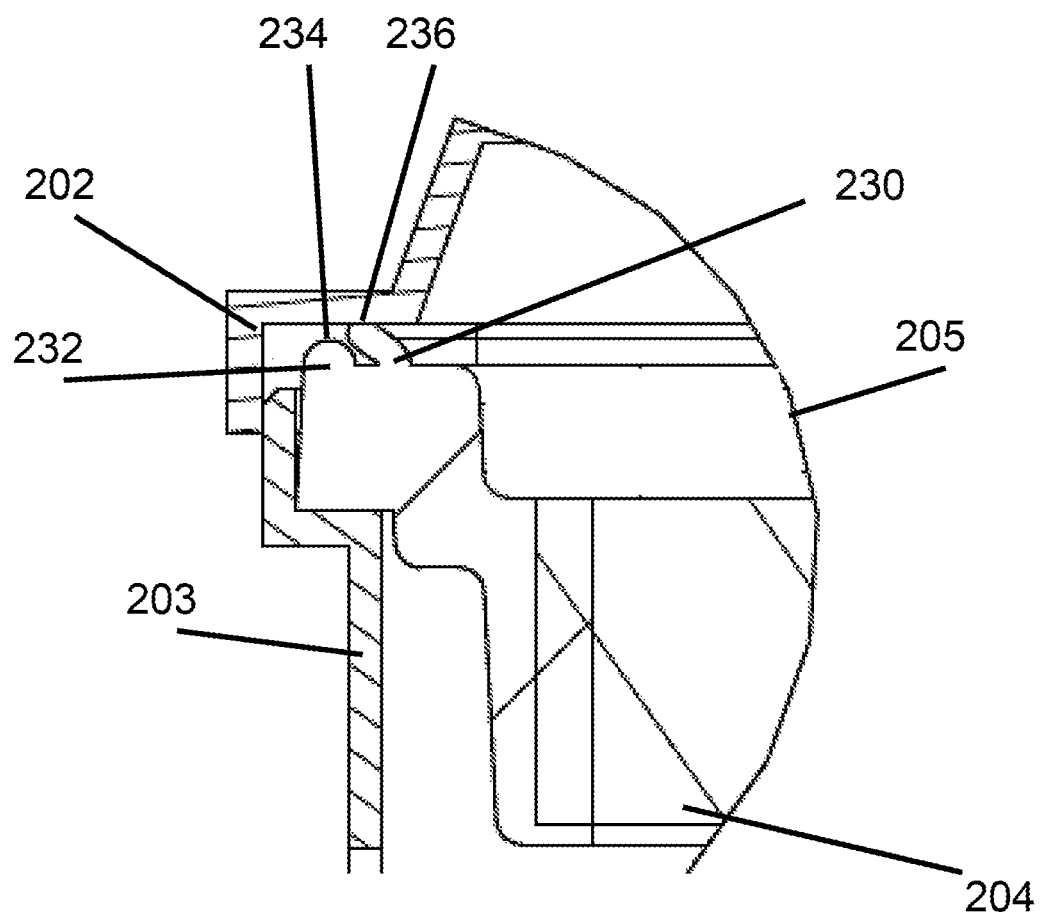
FIG. 17 is a sectional close up view of the sealing area of FIG. 16.

FIGS. 16 and 17 show the upper housing (202) and lower housing (203) beginning to close together as the tall sealing bead (230) begins initial compression. This is the first engagement of the tall sealing bead's sealing surface (236) to the upper housing (202). In FIG. 17 the image shows how the bead (230) will react under initial compression of 1-10%. The housing does not yet engage with the short sealing bead's sealing surface (234).

Figure 18:
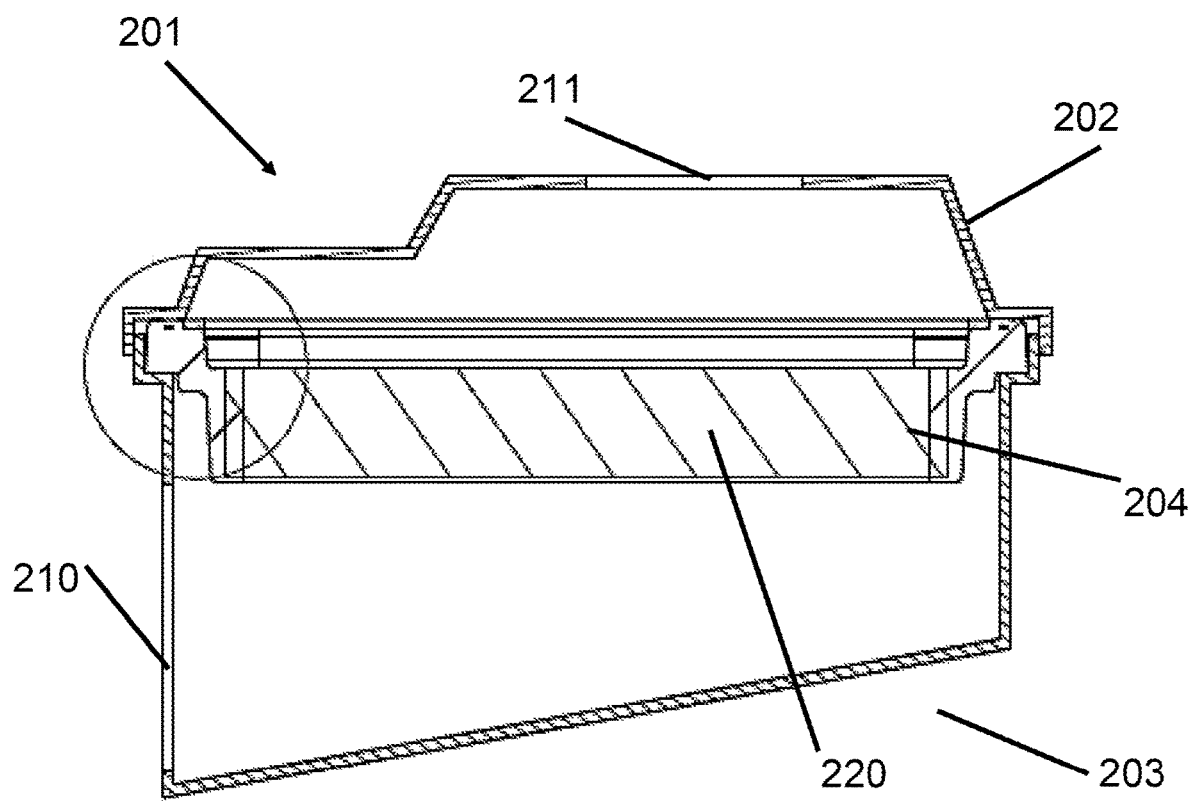
FIG. 18 is a sectional view of the air filter housing assembly with the upper housing and lower housing partially engaged for assembly and the seals shown under increased compression.
Figure 19:
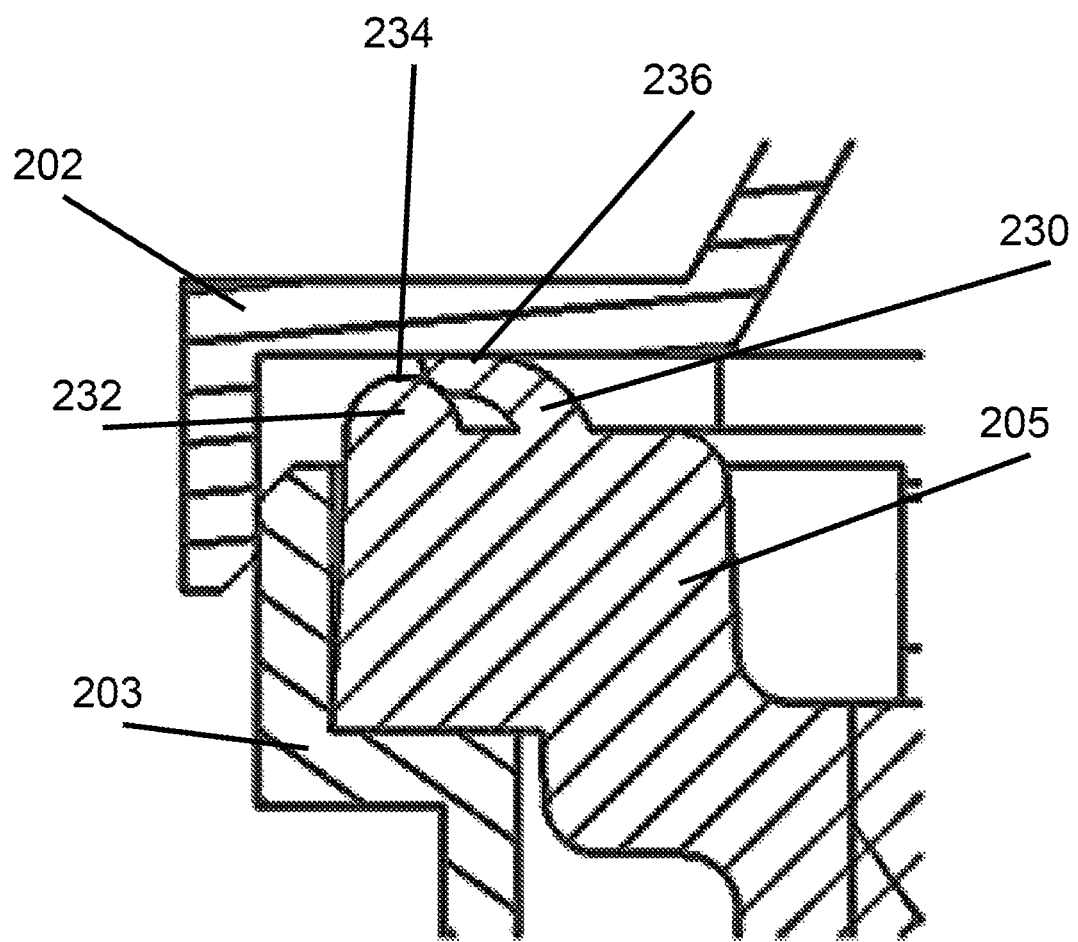
FIG. 19 is a sectional close up view of the sealing area of FIG. 18.

FIG. 18 and FIG. 19 show sectional views of the filter housing assembly (201) with the upper housing (202) and lower housing (203) partially engaged for assembly and the seals shown under increased compression of 10-15%. There is further engagement of the tall sealing bead's sealing surface (236) with the upper housing (202) and initial engagement of the upper housing (202) with the short sealing bead's sealing surface (234). As additional force of assembly is added, the short sealing bead (232) acts as a stop to limit the bending of the tall sealing bead (230).

The full assembly position is shown in FIG. 20 as a section view of the filter housing assembly (201) in FIG. 9. FIG. 20 shows the filter housing assembly (201) fully assembled into its final position with the upper housing (202) and lower housing (203) completely engaged in full assembly position and the seals shown under full compression of 16-25%. FIG. 20 shows how the tall sealing bead (230) and short sealing bead (232) will interact under full compression and during filter operation. The upper housing (202) fully contacts the short sealing bead's sealing surface (234) and creates a seal at the short sealing bead (232) and additionally the upper housing (202) compresses and rolls the tall sealing bead (230) onto the short sealing bead (232) creating a secondary seal surface. The short sealing bead (232) acts as a stop to limit the bending and rolling of the tall sealing bead (230). As the tall sealing bead (230) is rolled over onto the short sealing bead (232) it applies the force of the housing cover onto the farthest point along the perimeter of the filter. The surface area of seal against the upper housing (202) is maximized and provides a robust seal against the passage of unfiltered air. Once full compression is achieved on the seals (230)(232) the addition of the air flowing through the filter housing assembly (201) adds air pressure on the housing wall and the increase pressure on the joint area further maintains a robust seal.

In the event of uneven compressive forces around the perimeter of the filter housing assembly (201), the tall sealing bead (230) rolls over and creates a small air gap between the two beads (FIG. 18) which provides a secondary block against any dust that may pass through the first seal. The surface between the tall sealing bead (23) and the Upper Housing (202) is maximized and the short sealing bead (232) provided a stop for the bending and rolling of the tall sealing bead (230). This interaction between the two beads eliminates the effects of uneven compression and creates a perfect seal around the filter.

Figure 21:
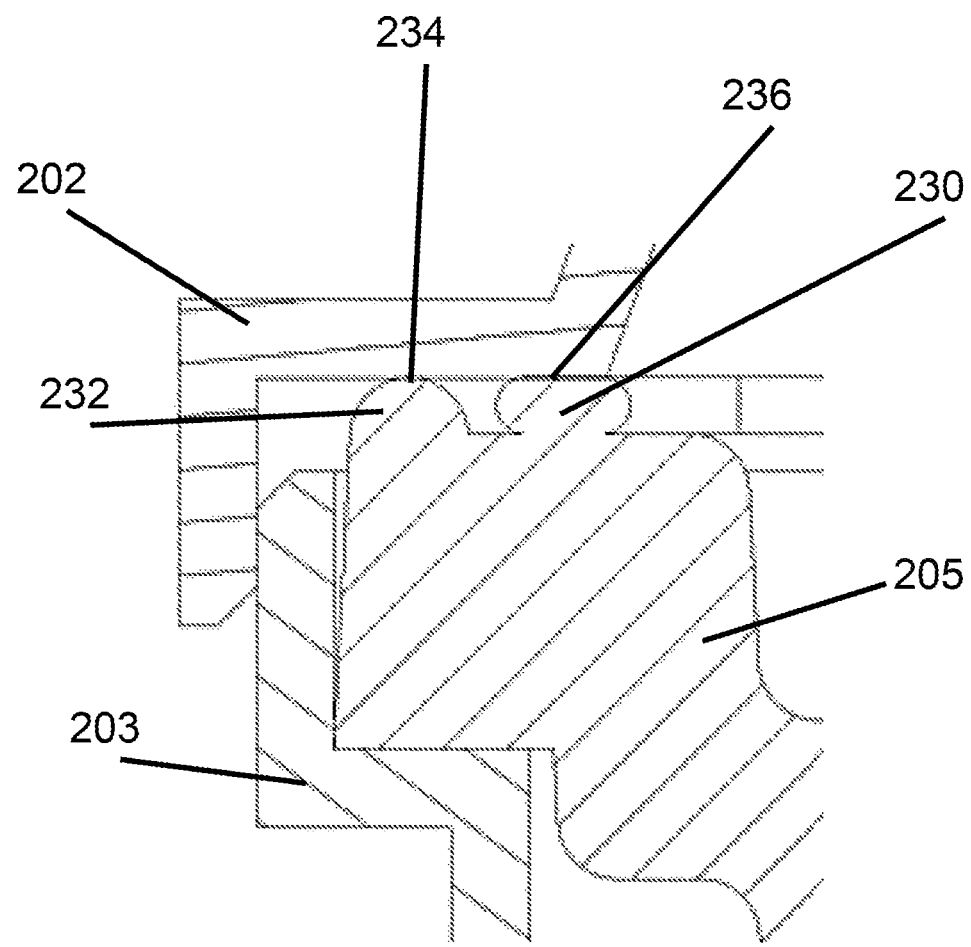
FIG. 21 shows a sectional close up view of the sealing area in an alternate compressive state when completely engaged in full assembly position assembled under full compression.

In an alternate embodiment, FIG. 21 shows an alternate compressive state. The taller sealing bead (230) is compressed straight down without folding. In a fully compressive state the two sealing beads (230)(232) act individually and the short sealing bead (232) acts as a stop to ensure the tall sealing bead (230) is not overly compressed and permanently damaged. In this case the short sealing bead (232) is used to create a primary seal and the tall sealing bead (230) is used to create a secondary higher compression safety seal. The taller sealing bead (230) compresses 20-25% with a high amount of surface contact with the Upper Housing (202) and will seal any small voids in the tall sealing bead (230). The short sealing bead (232) compresses 10-15% and acts as a stop to control the amount of compressive forces on the taller sealing bead (230).

Figure 22:
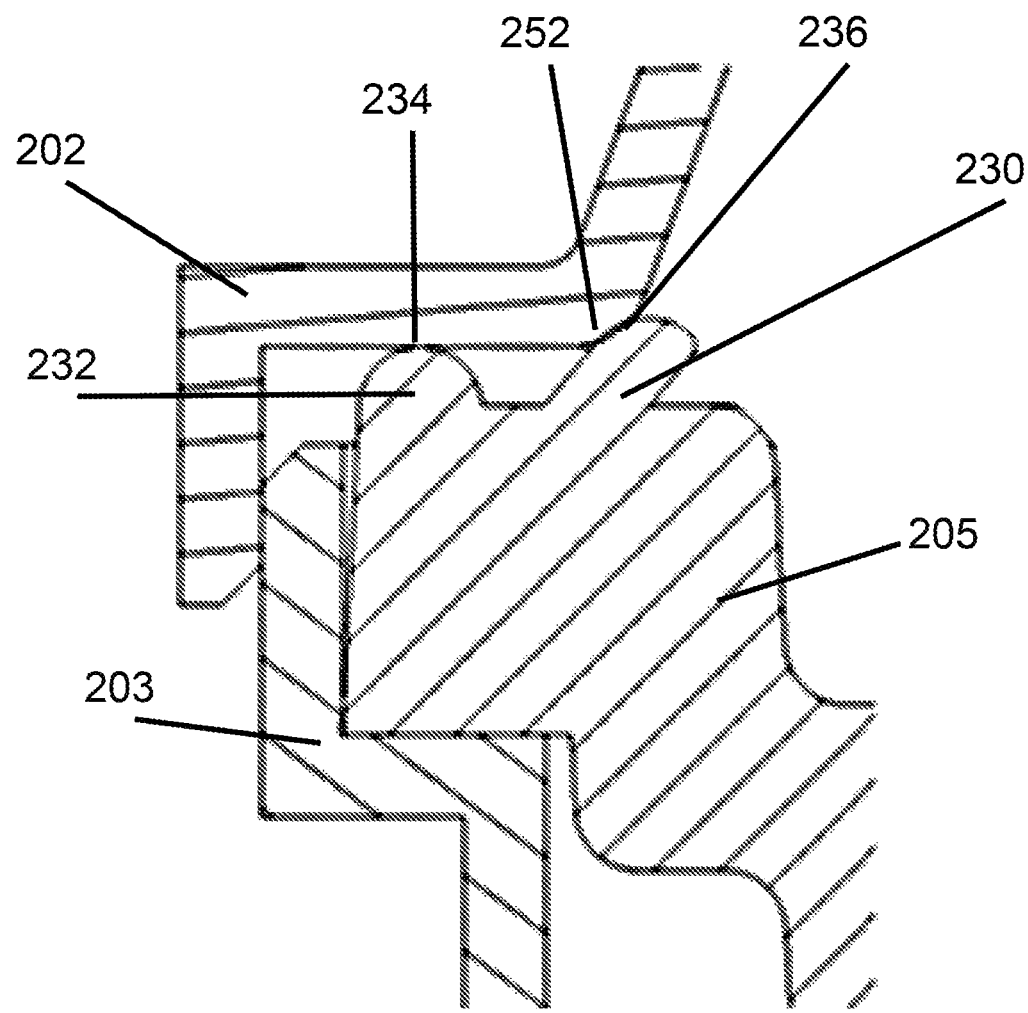
FIG. 22 shows a sectional close up view of the sealing area in an alternate compressive state when completely engaged in full assembly position assembled under full compression.

In a second alternate embodiment, FIG. 22 shows a sectional close up view of the sealing area when assembled under full compression. The tall sealing bead (230) is rolled away from the short sealing bead (232), opposite the normal direction. This can be caused by the upper housing (202) being chamfered (252) with an angle at the corner where it contacts the tall sealing bead (230). The short sealing bead (232) is compressed 16-20% with the upper housing (202) and a large gap is opened up between the two beads. The short sealing bead acts as a stop to prevent excess assembly movement and positive contact is made between the side of the tall sealing bead (230) and the upper housing (202) and sealing to the upper housing (202) occurs on a larger surface area and prevents leakage of air flow. The short sealing bead (232) acts as a stop to control the amount of compressive forces on the tall sealing bead (230).

Figure 23:
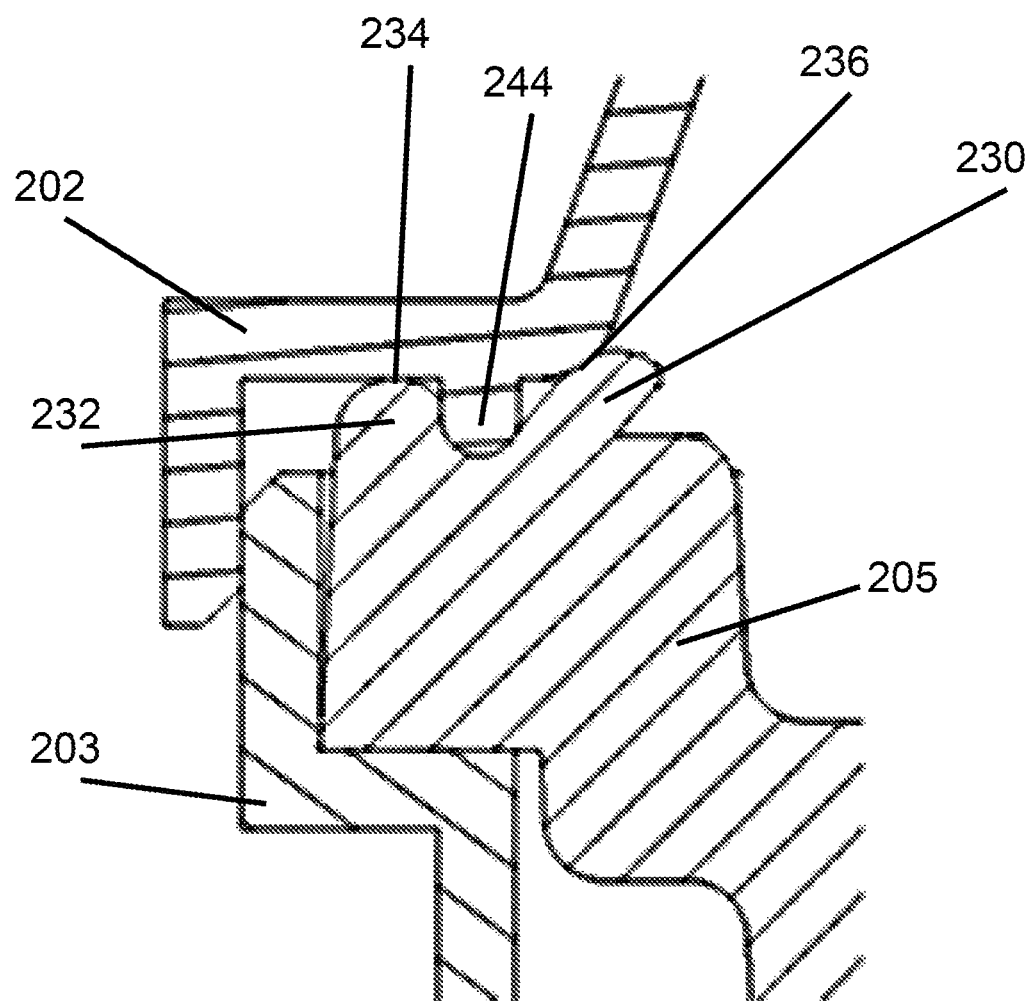
FIG. 23 shows a sectional close up view of the sealing area in an alternate compressive state when completely engaged in full assembly position assembled under full compression.

In a third alternate embodiment as in FIG. 23, the two seals are separated by a protruding formation (244) located on the upper housing (202). FIG. 23 shows a sectional close up view of the sealing area when assembled under full compression. The upper housing (202) has a protruding formation (244) to provide control of the seal movement and maximize compression while providing a locating feature for the housing to close easily. With the multiple bead design, one bead seals on each side of the protruding formation (244). Sealing is made on three locations to eliminate leakage. The short sealing bead's sealing surface (234) seals against the upper housing (202) providing first seal. The protruding formation (244) on the upper housing (202) fits snugly and seals into the filter body gasket (205) between the two sealing beads and alongside of the tall sealing bead (230) and the short sealing bead (232). The tall sealing bead (230) is positioned to fold over opposite the preferred direction and creates a third sealing surface with the upper housing (202).

Figure 24:
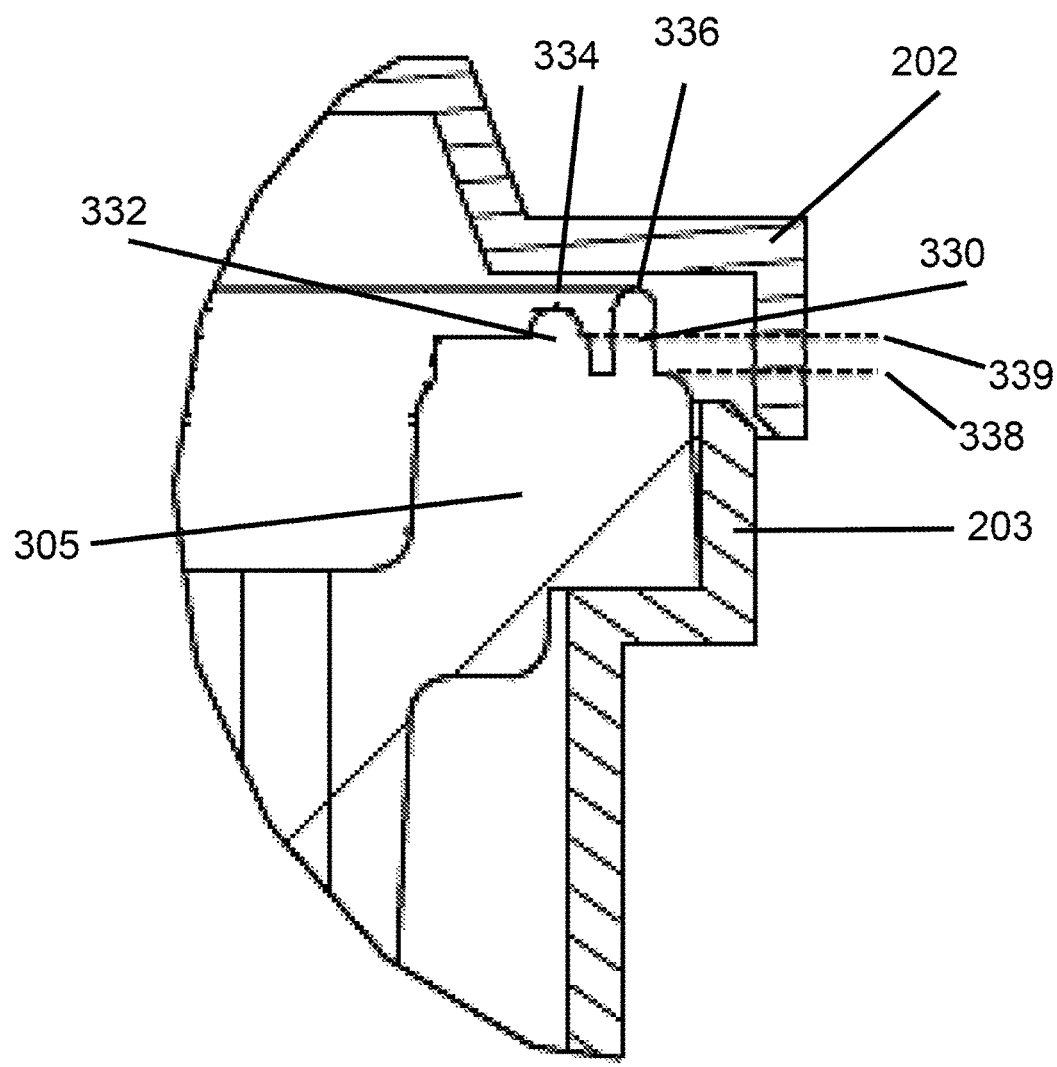
FIG. 24 shows a sectional view of the sealing area in an alternate configuration where the two beads start on different planes (338) (339).
Figure 25:
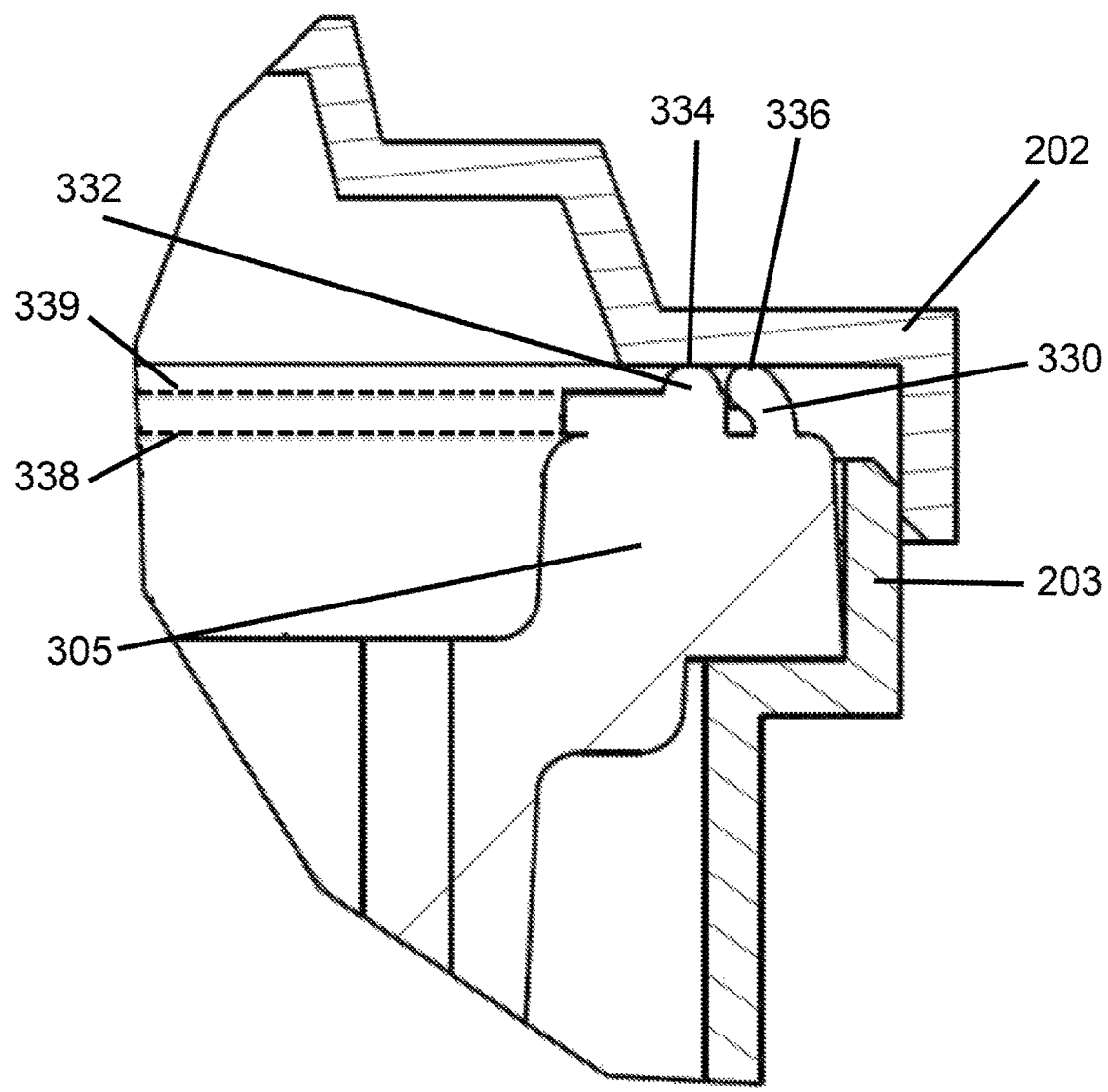
FIG. 25 shows the sectional view of FIG. 24 when complete engaged in full assembly position assembled under full compression.

In a fourth alternate embodiment as shown in FIG. 24, the two seals (330)(332) have base points that begin on two different parallel planes (338)(339). FIG. 25 shows a similar interaction to the sealing beads during full compression assembly as in previous embodiments. FIGS. 24 and 25 show that the beads do not have to reside on the same plane for implementation of the present disclosure.

Figure 26:
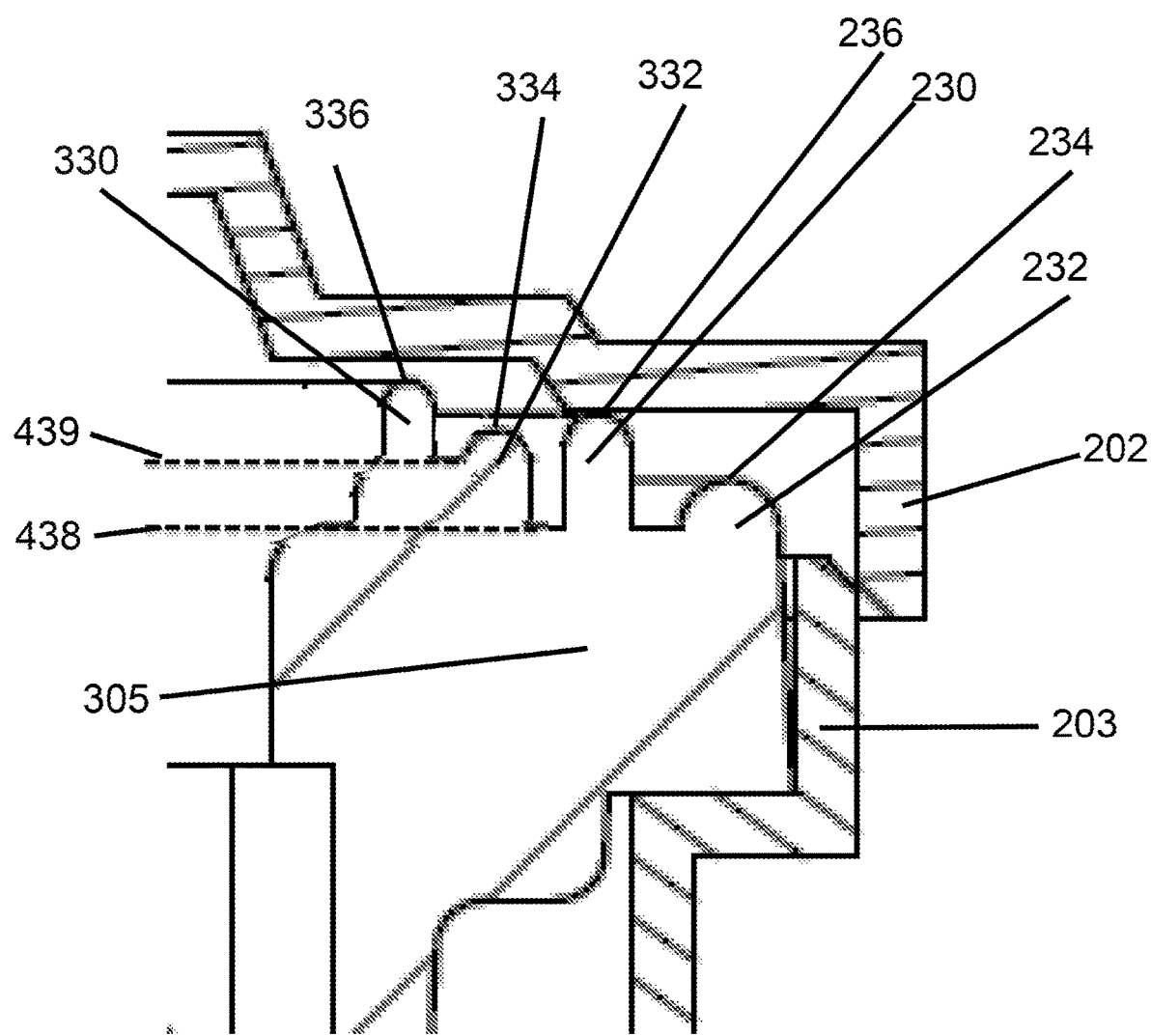
FIG. 26 shows a sectional view of the sealing area in an alternate configuration where two sets of two beads are used for assembly.
Figure 27:
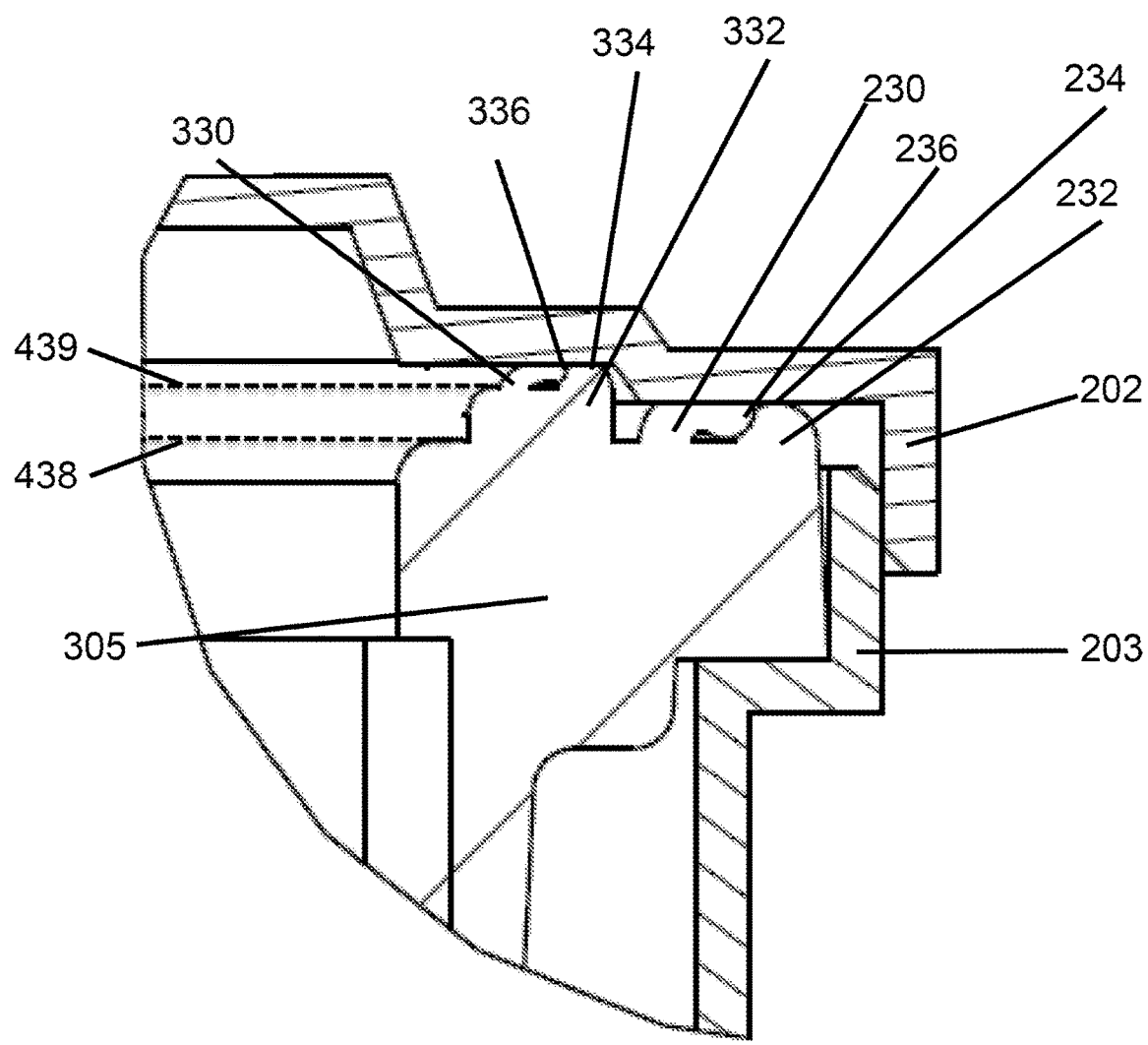
FIG. 27 shows the sectional view of FIG. 26 when completely engaged in full assembly position assembled under full compression.

In a fifth alternate embodiment shown in FIGS. 26 and 27, there can be two sets of two sealing beads, (330)(332) and (230)(232), to create the sealing on the surface of the housing. In this figure the housing is shown with two separate sealing surfaces on two different parallel axis planes (438)(439). FIG. 27 shows a similar interaction to the sealing beads during full compression assembly as in previous embodiments.

The present disclosure is not limited to use in a flat panel filter (204). FIGS. 28 thru 41 show the application of the present disclosure to additional filter shapes and configurations.

Figure 28:
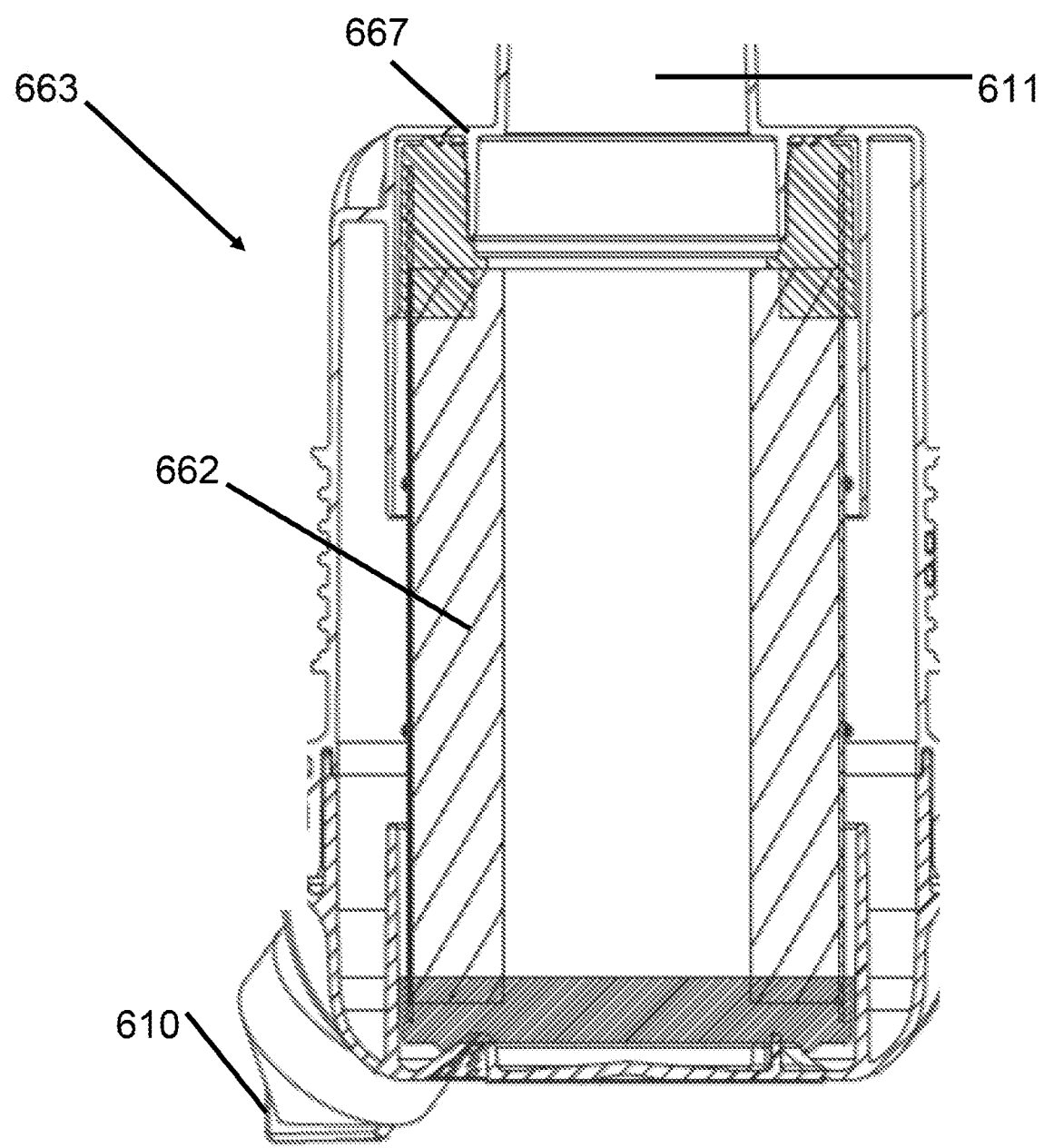
FIG. 28 shows the present disclosure represented when used in a cylindrical filter housing.
Figure 29:
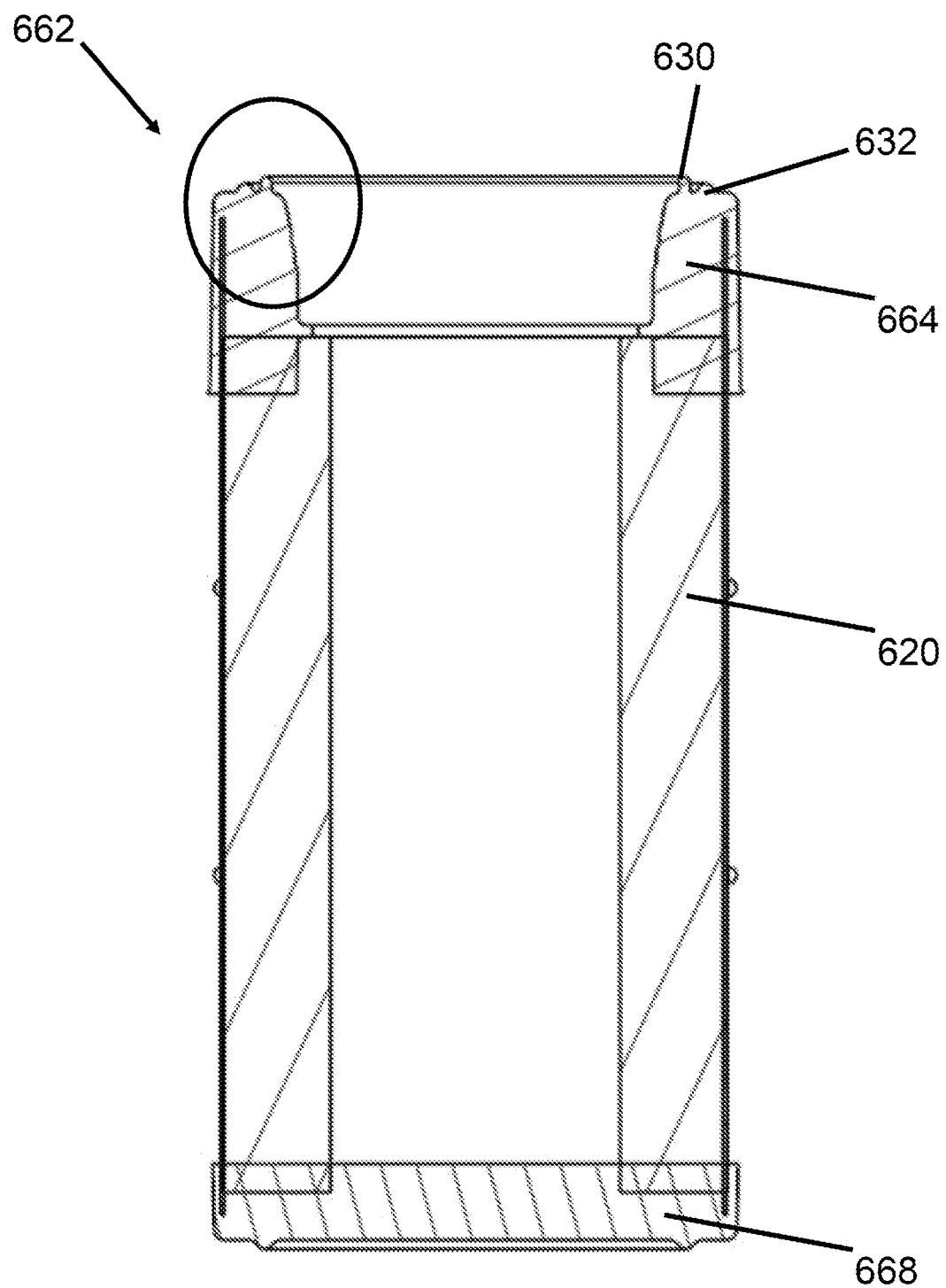
FIG. 29 shows the cylindrical filter element from FIG. 28 per the present disclosure.
Figure 30:
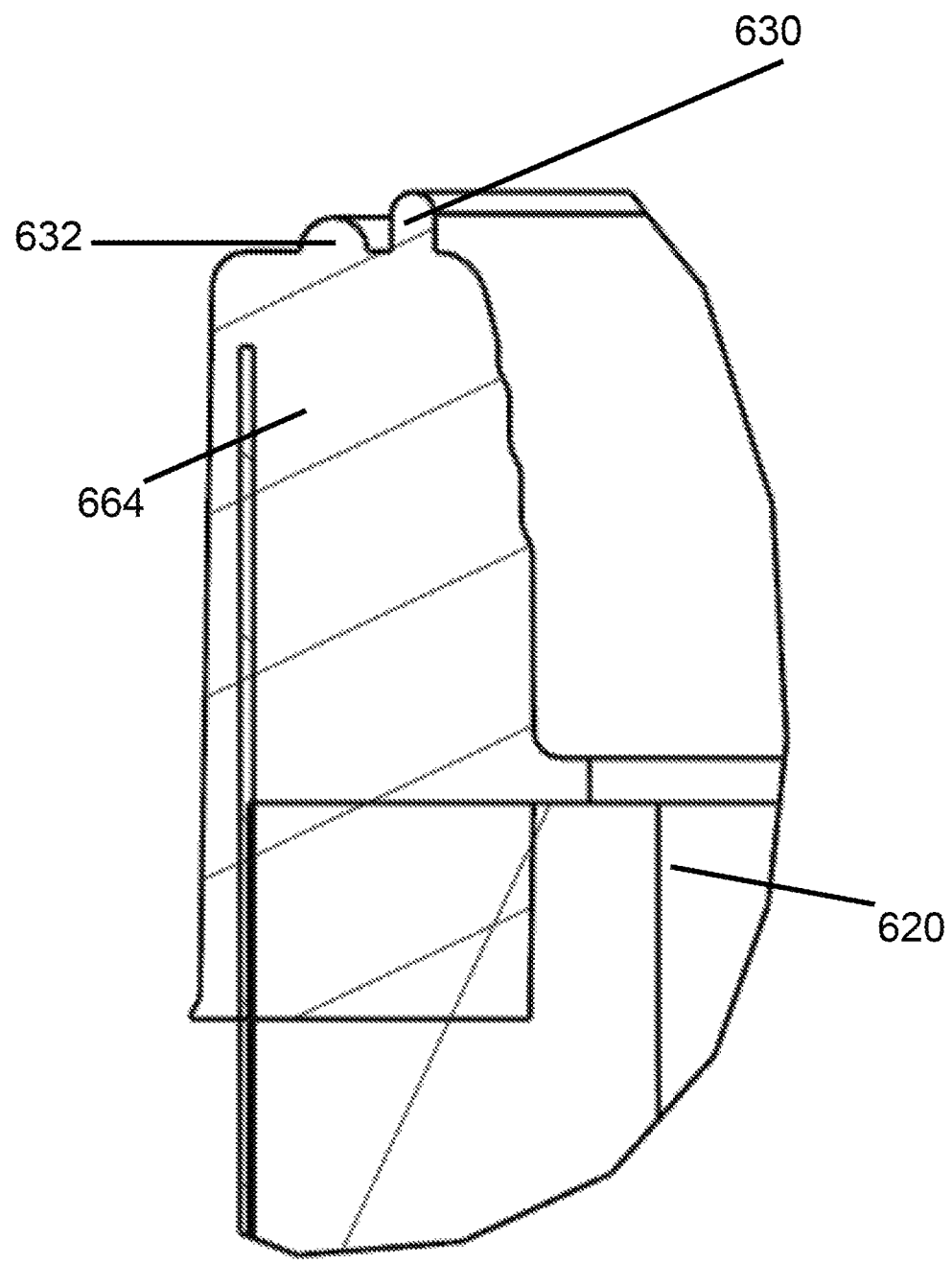
FIG. 30 shows a sectional close up view of the sealing area of the cylindrical filter element in FIG. 29.
Figure 31:
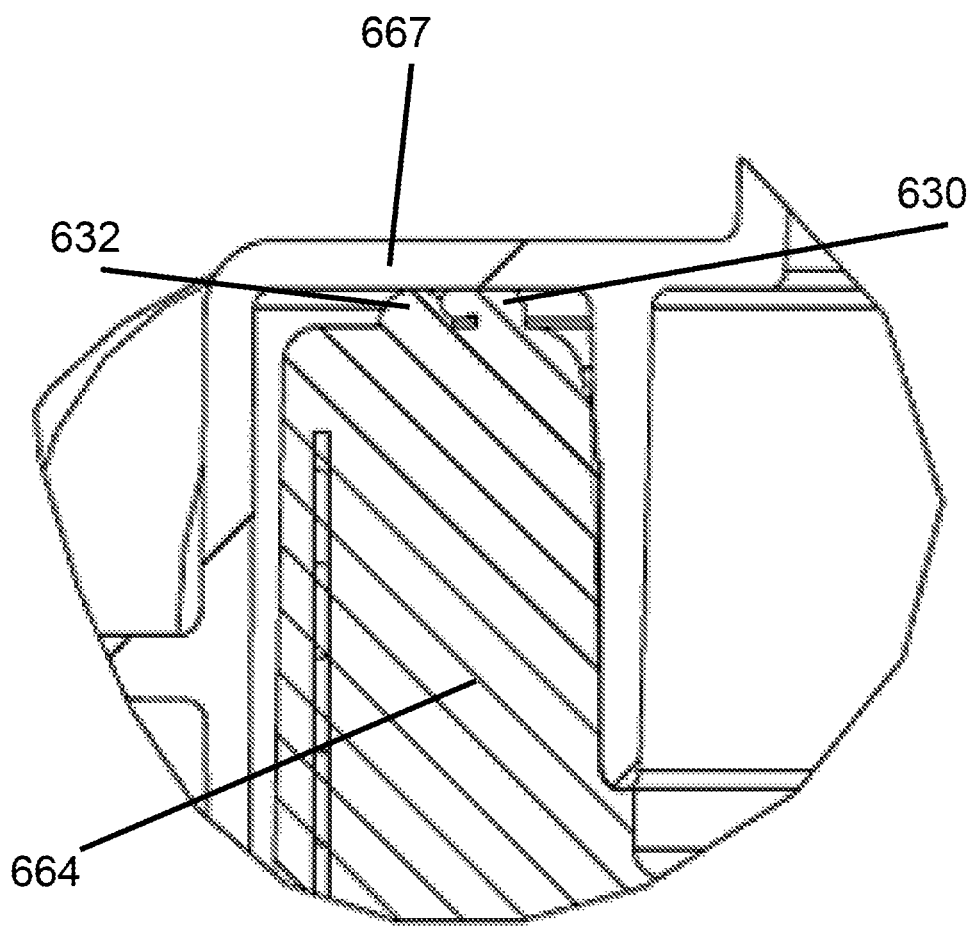
FIG. 31 shows a sectional close up view of the sealing area in the cylindrical element filter housing of FIG. 28 when completely engaged in full assembly position assembled under full compression.
Figure 32:
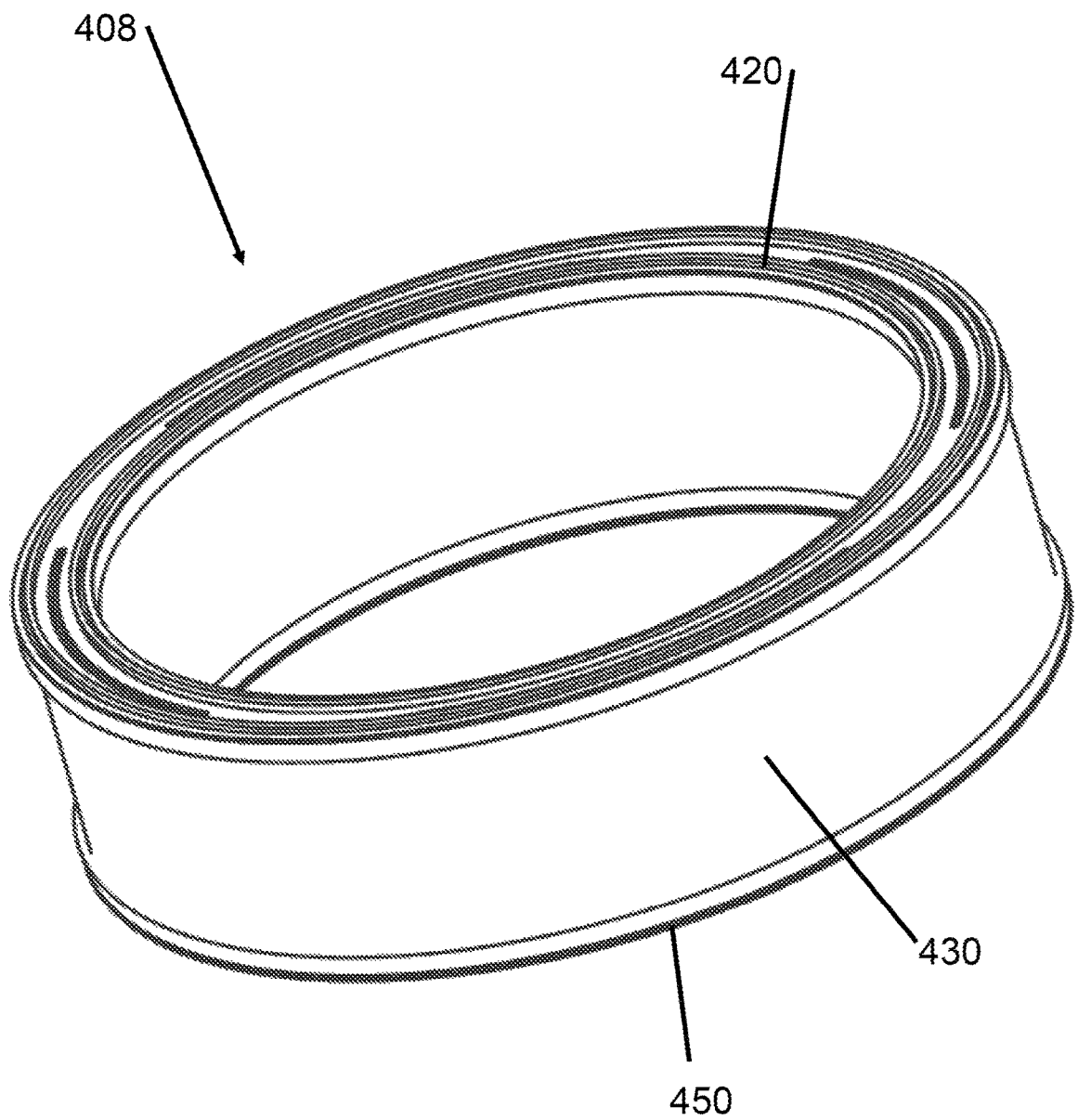
FIG. 32 shows the present disclosure represented in use in a round filter.
Figure 33:
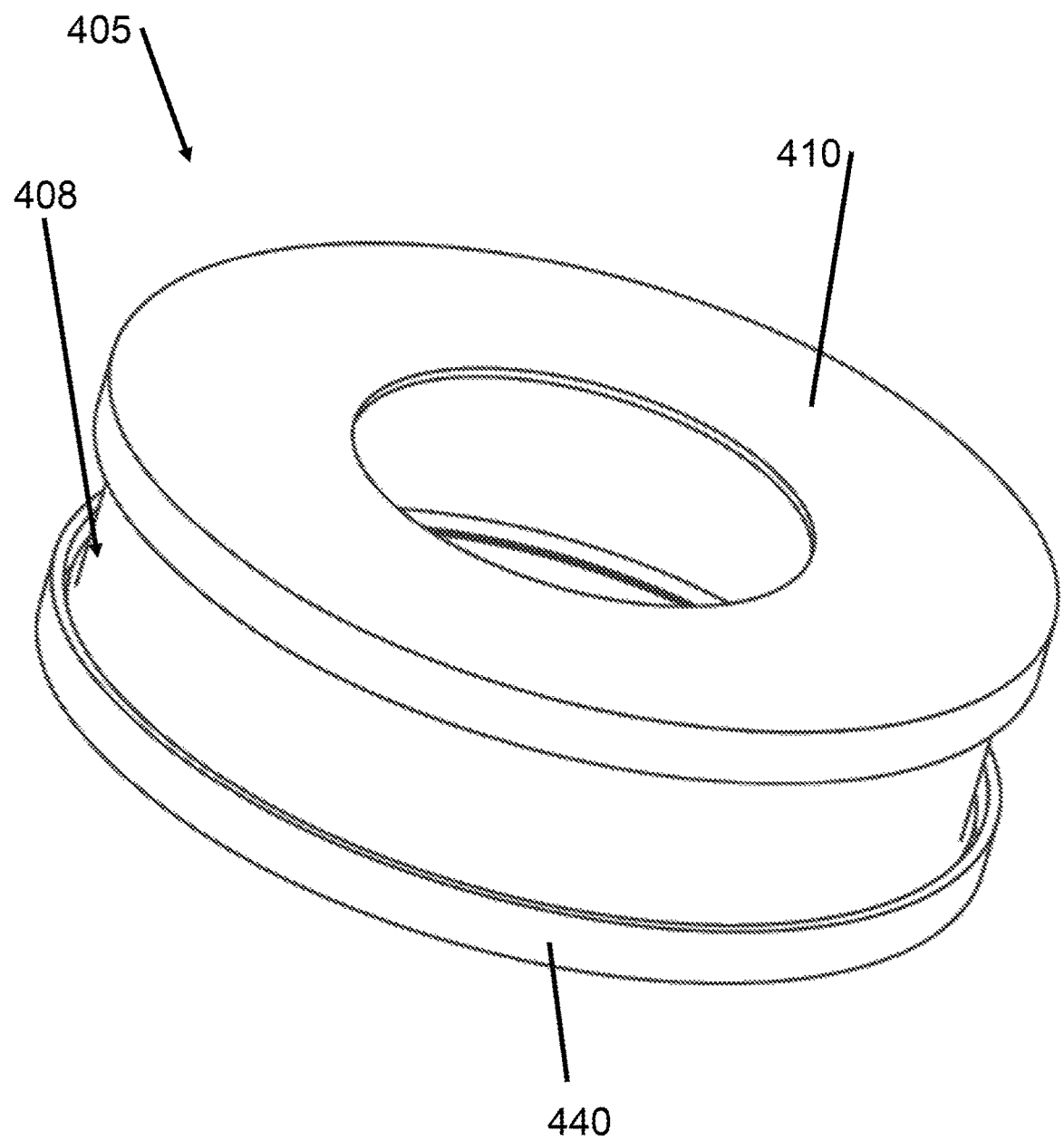
FIG. 33 shows the round filter of FIG. 32 as installed inside a housing.
Figure 34:
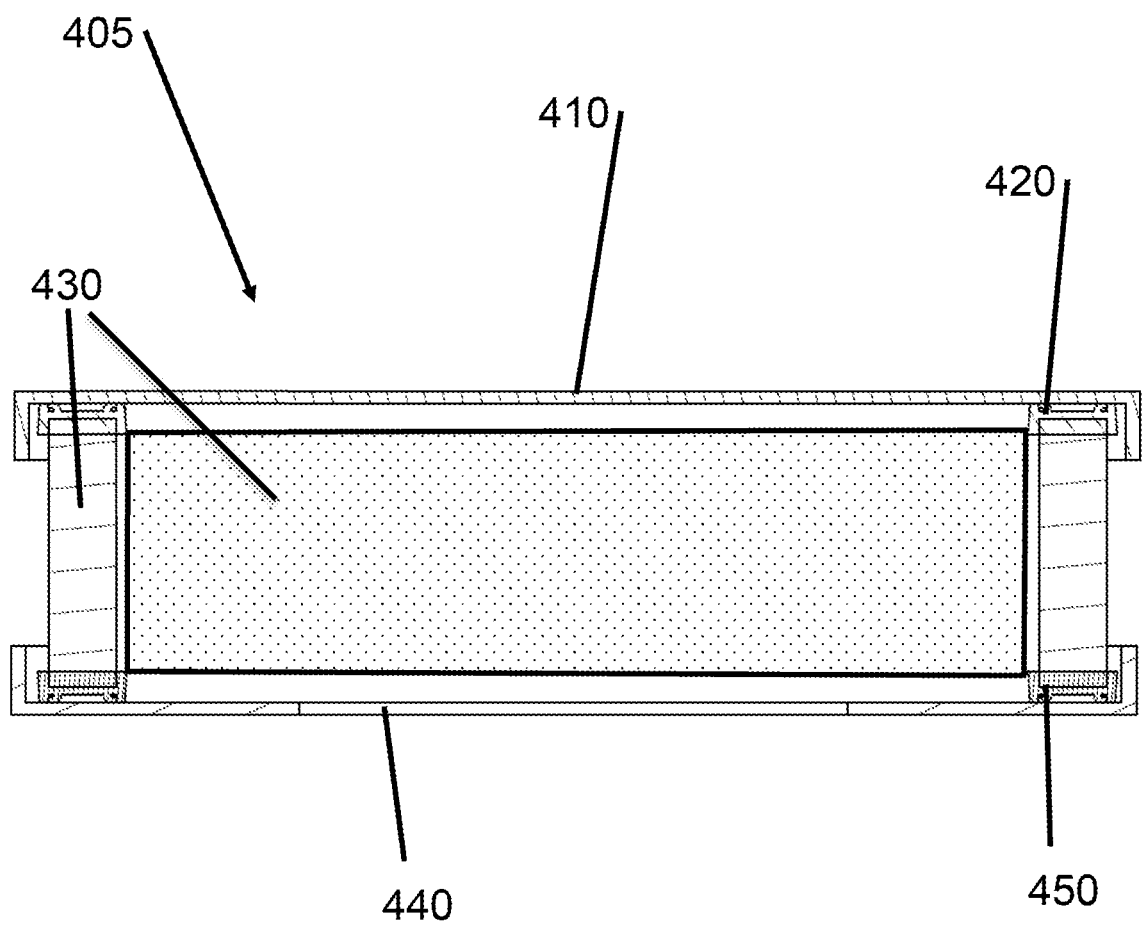
FIG. 34 is a side cutaway view of FIG. 33.
Figure 35:
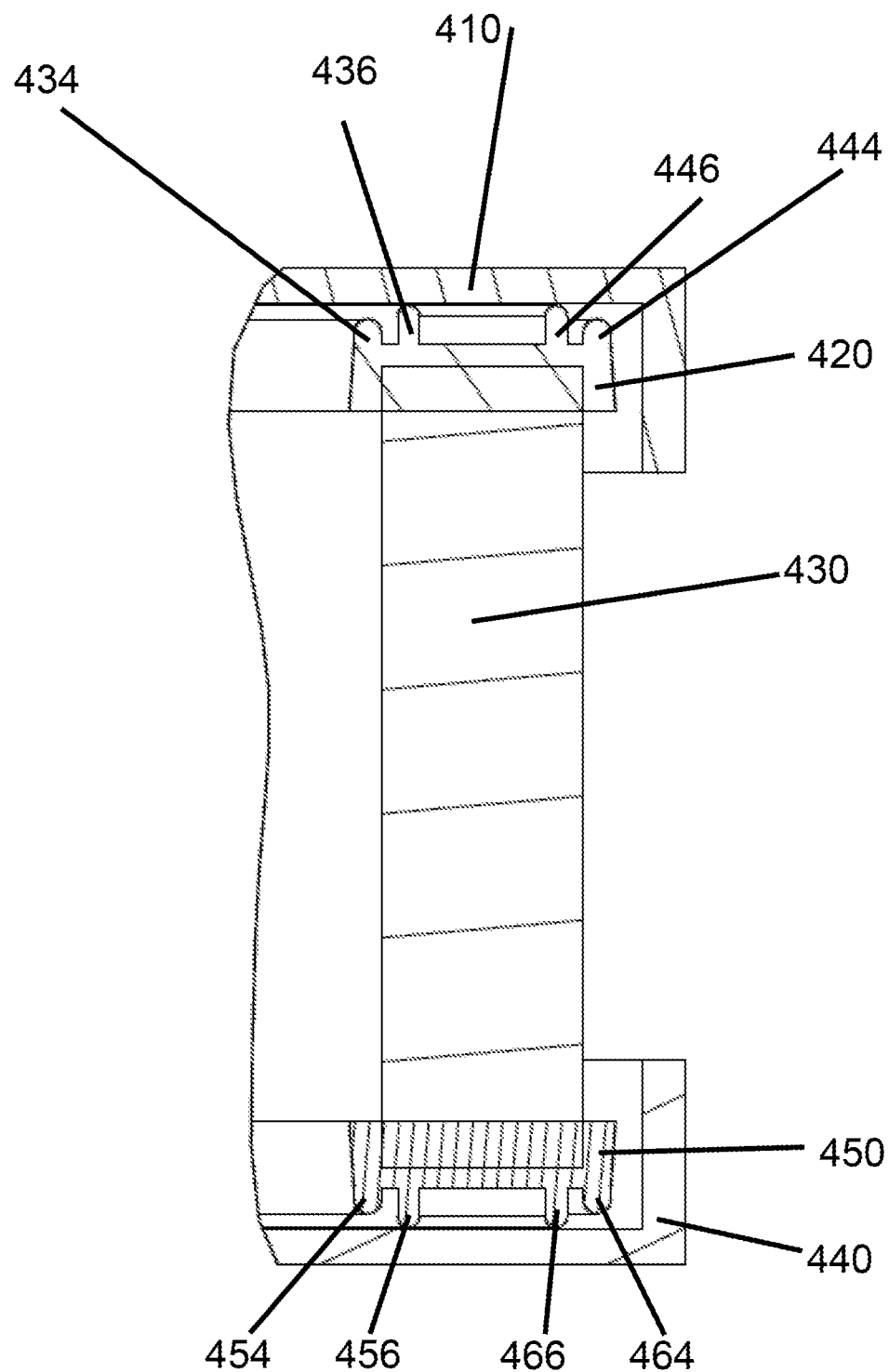
FIG. 35 is a close up view of the side of FIG. 34 showing the sealing configuration before compression and full assembly.

FIG. 28 through FIG. 31 demonstrate the ability to use the present disclosure in a cylindrical filter housing. In FIG. 28 the filter housing assembly (663) encloses the filter element (662) with air inlet (610) and air outlet (611). The filter element (662) seals against the upper housing (67) as shown in FIG. 29, the short sealing bead (632) and tall sealing bead (630) are positioned as a part of the Filter Gasket (664) along with a lower gasket (668) for holding the filter media (620). FIG. 30 shows a close up view of the bead structure of the present disclosure in the cylindrical filter arrangement. The compression of the seals (630)(632) with the cylindrical upper housing (667) of a cylindrical filter housing (663) as shown in FIG. 31.

Figure 36:
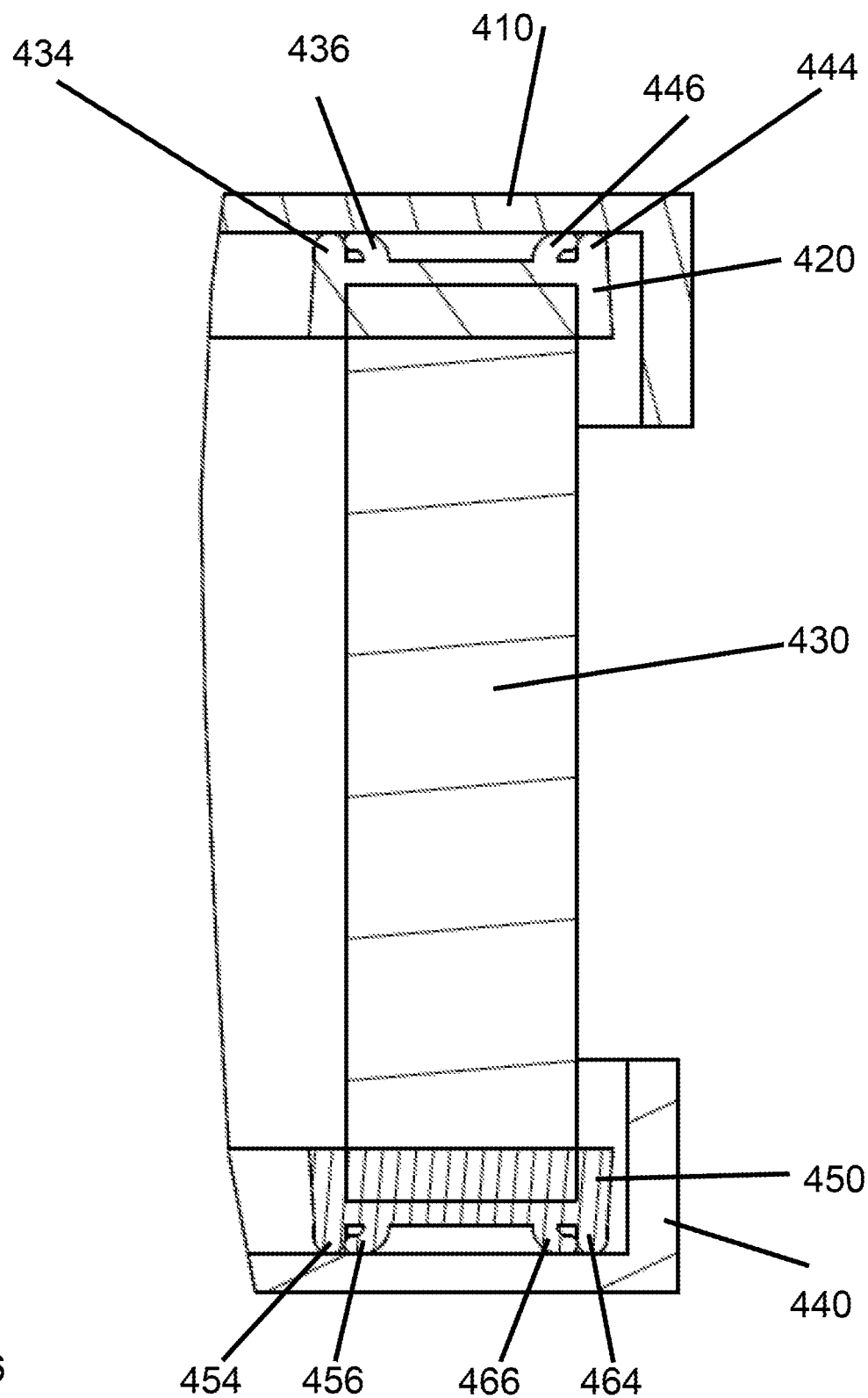
FIG. 36 shows the close up sectional view of FIG. 34 when the assembly is complete engaged in assembled position under compression.
Figure 37:
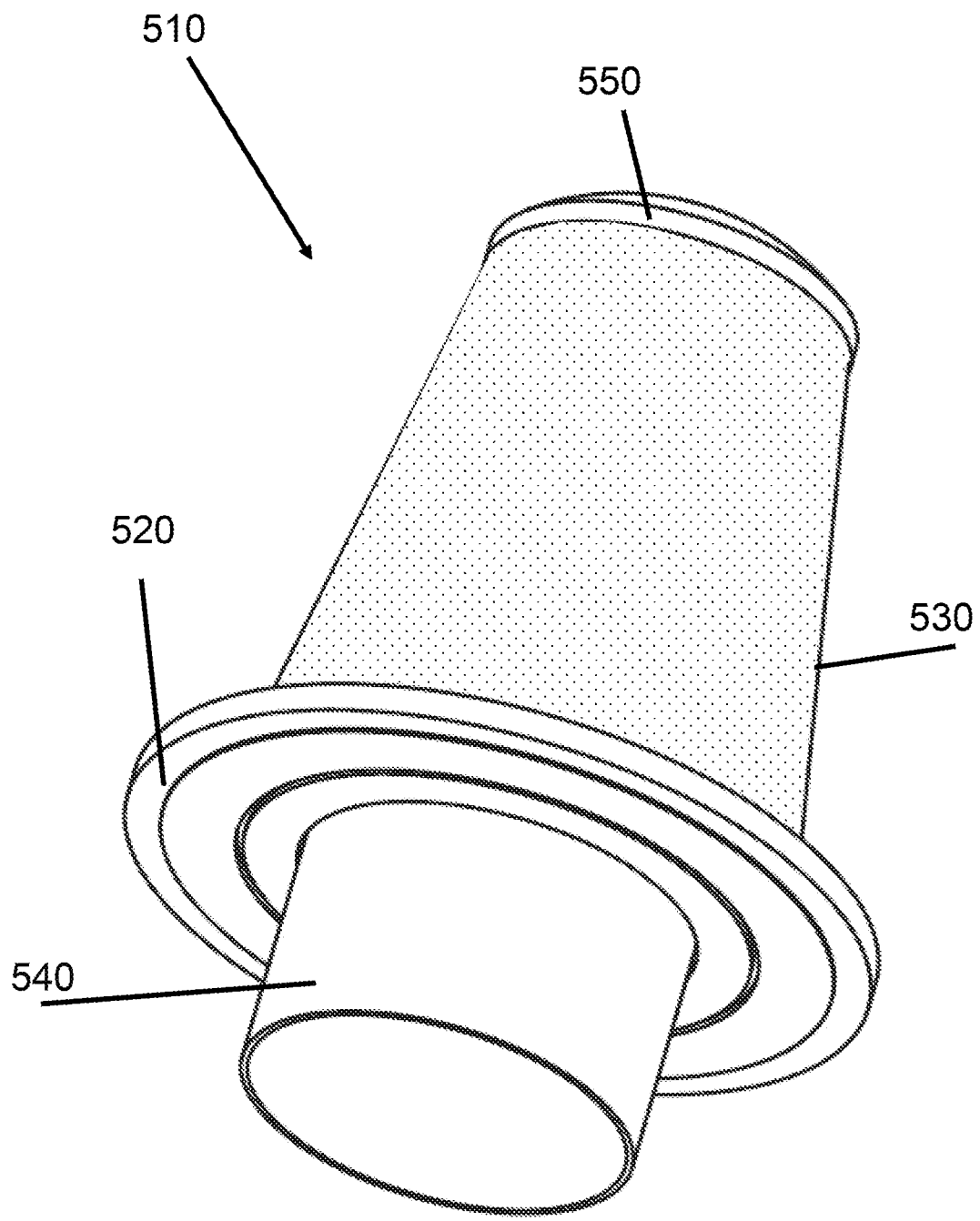
FIG. 37 shows the present disclosure represented in use in a conical filter.
Figure 38:
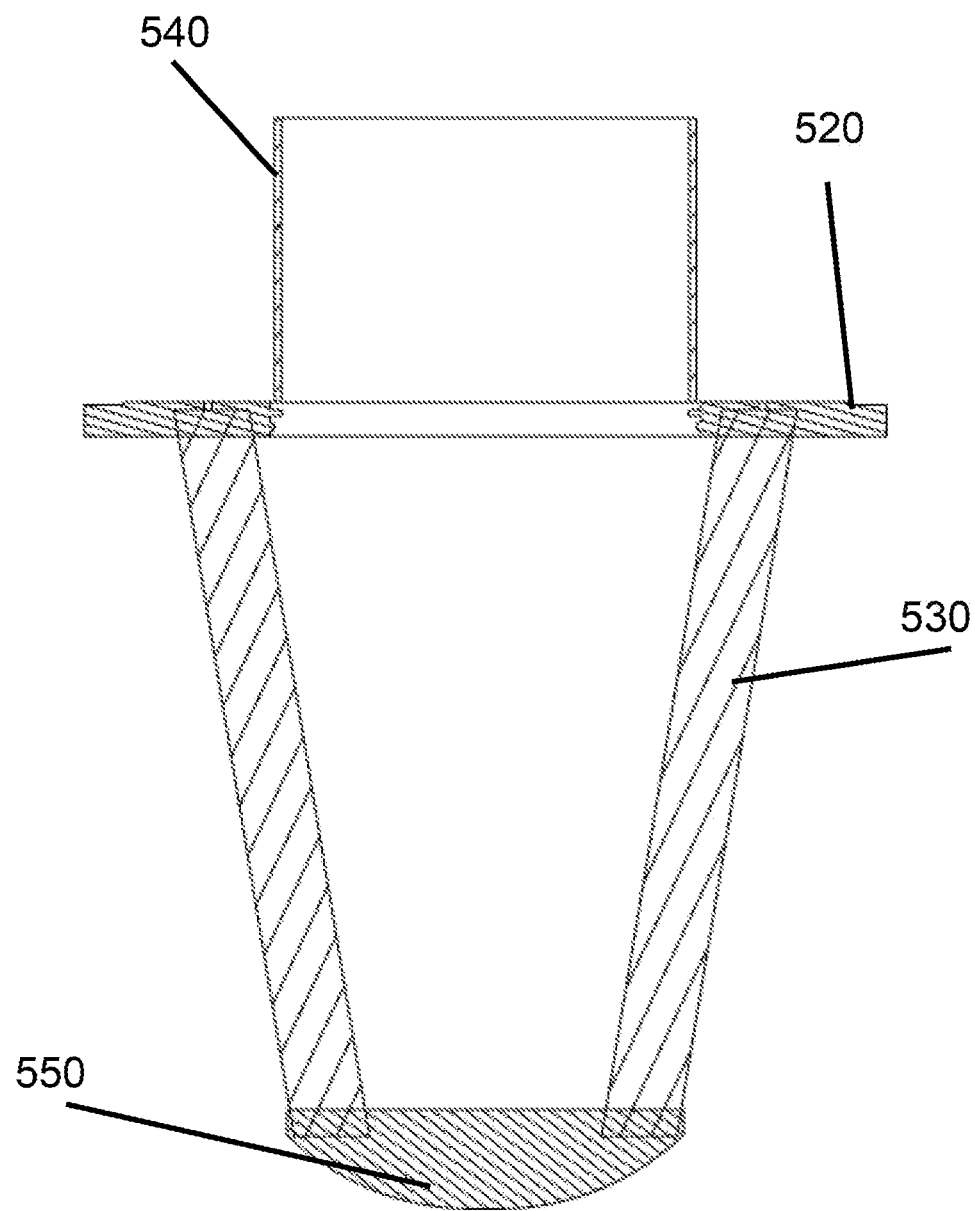
FIG. 38 shows a side cutaway view of FIG. 37 prior to assembly to the outlet tube port (540).
Figure 39:
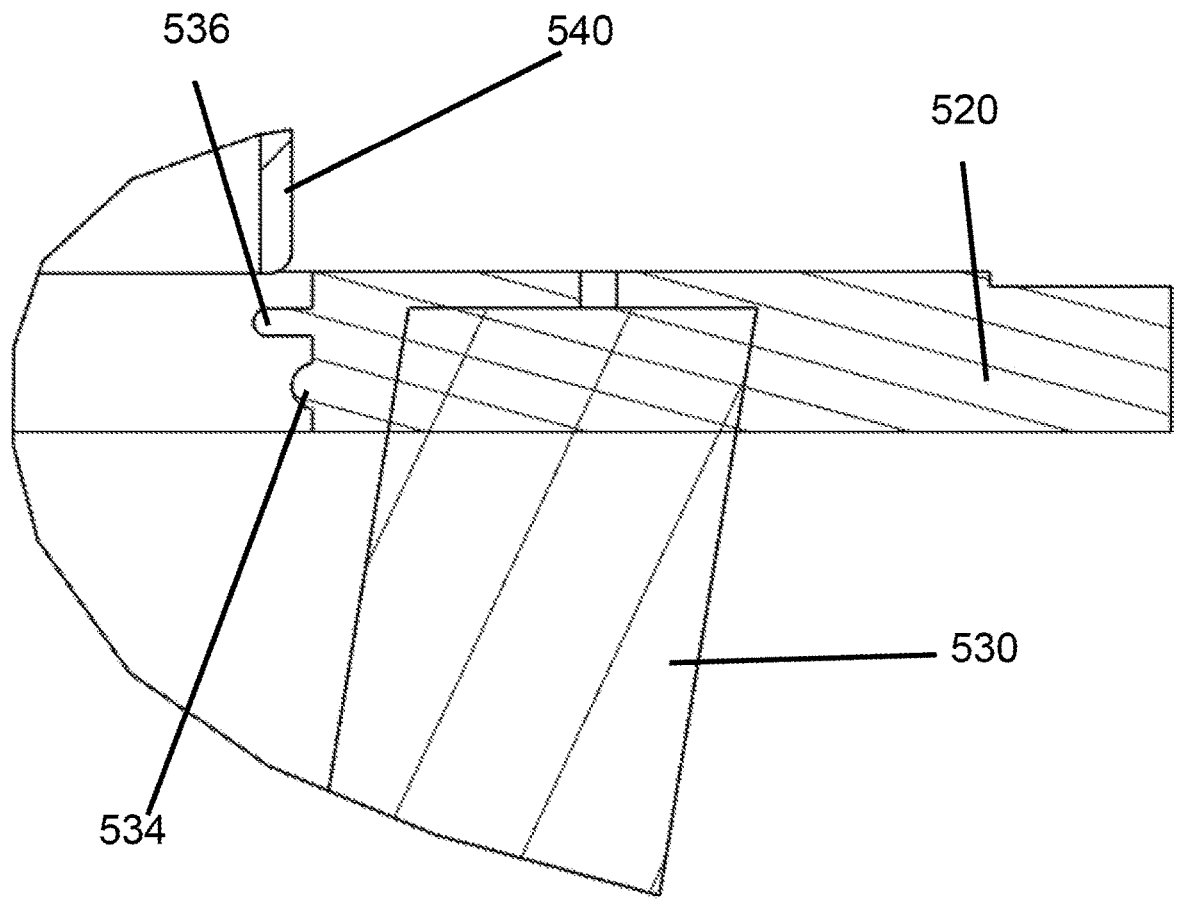
FIG. 39 shows a close up view of the sealing configuration of FIG. 38.
Figure 40:
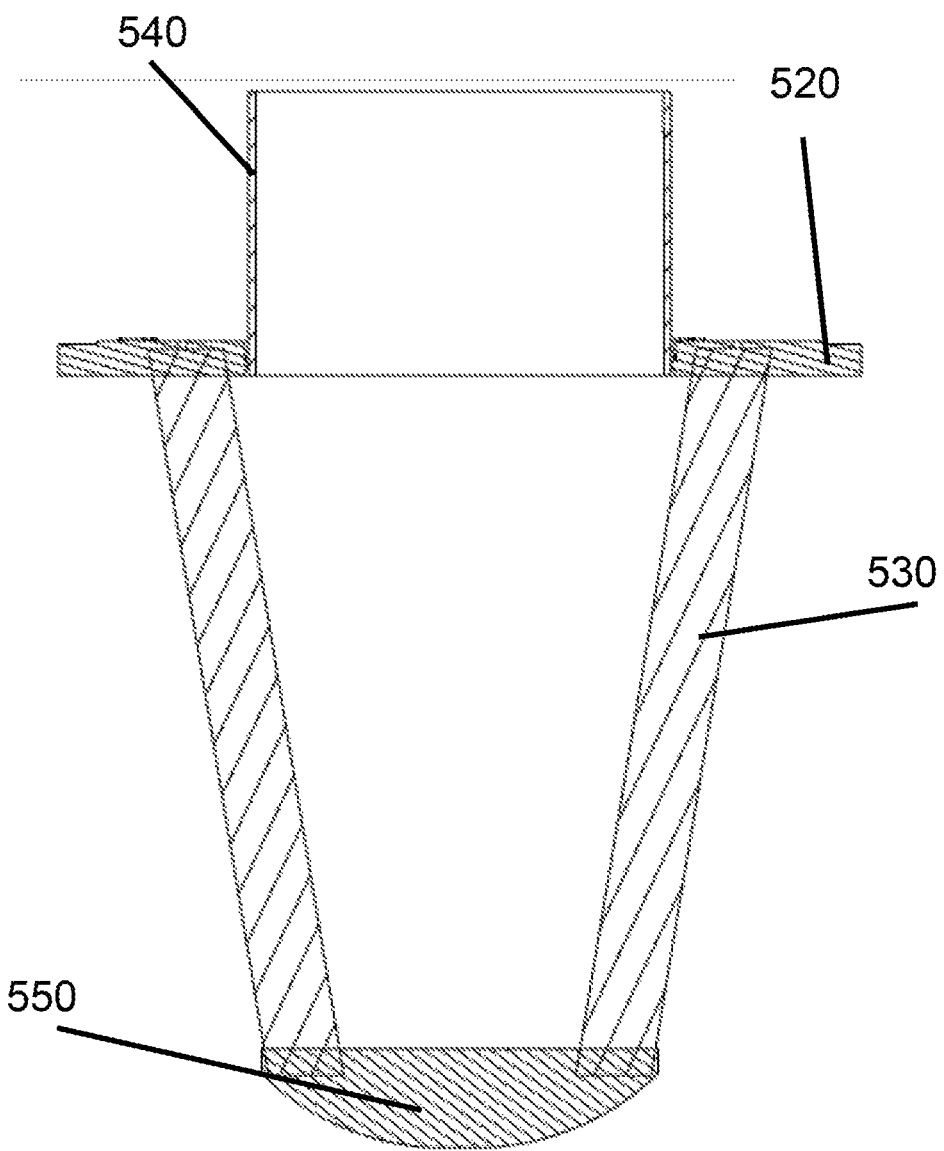
FIG. 40 shows the conical filter and seals when assembled to the outlet tube port (540).
Figure 41:
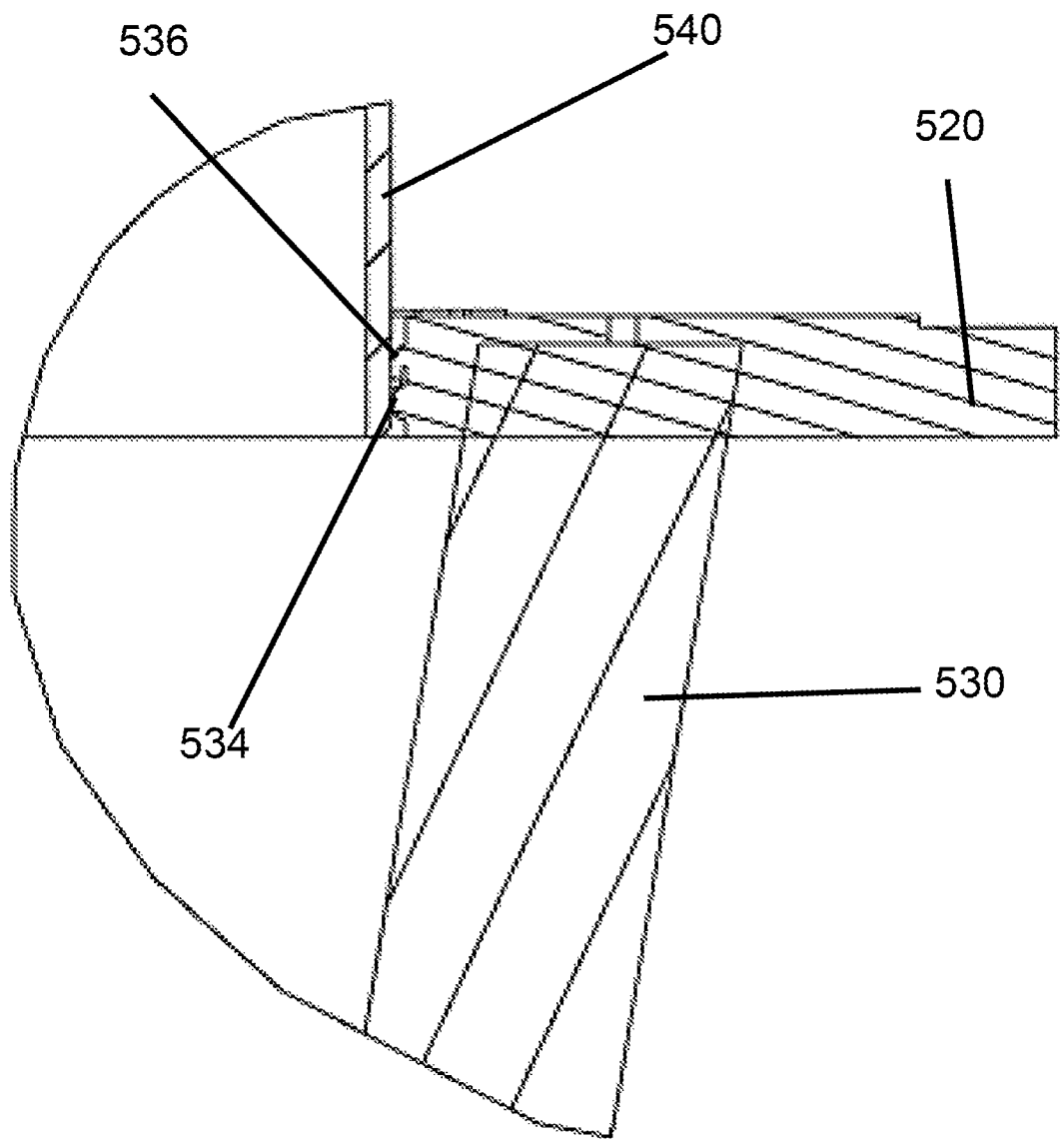
FIG. 41 shows a close up view of the sealing configuration of FIG. 40.

FIGS. 32 through 36 Use the present disclosure in a round filter (408) installed into upper housing (410) and lower housing (440) in the filter assembly (405). In FIG. 36, there are two sets of sealing beads (434)(436)(446)(444) on the upper filter gasket (420) interacting with the upper housing (410) and two sets of similar sealing beads (454)(456)(466)(464) on the lower filter gasket (450) interacting with the lower housing (440).

FIG. 37 through 41 demonstrate the ability to use the present disclosure in a conical filter housing. The conical filter (510) is installed onto an outlet tube port (540) for filtering air flow. Filter media (530) is attached to filter gasket upper (520) and filter gasket lower (550). The short sealing bead (534) and tall sealing bead (536) are positioned as a part of the inner diameter of the Filter Gasket upper (520) and these seal with the outer surface of the outlet tube port (540) as shown in the assembled FIG. 41.

For the various embodiments described above and below, the protruding beads on the filter gasket for compression to the housing are rounded in shape, but thinner blades, ovals or other protruding geometric shapes will perform in the same manner when coupled in tandem with one or more longer or shorter beads of similar or different shape.

The present disclosure presents using two beads of unequal height and in proximity to each other around the perimeter of the filter to overcome prior leakage issues. This does not intend to limit the number of seals to two. The use of more than two seals beads is possible and does not take away from the function and disclosure of the two unequal height seals.

The present disclosure may be embodied in other forms without departing from the spirit or novel characteristics thereof. The embodiments disclosed in this application are to be considered in all respects as illustrative and not limiting. The scope of the present disclosure is indicated by the appended claims rather than by the foregoing description; and all changes which come within the meaning and range of equivalency of the claims are intended to be embraced therein.

What is claimed is:

1. A filter for installation into a housing that has a surface that compresses a portion of the filter, the filter comprising:
 a filter body made of porous material;
 a gasket located around the perimeter of the filter body; and
 a seal formed on the gasket and positioned to engage the surface of the housing, the seal including two raised formations of compressible material having different sizes, wherein the two raised formations each form a seal with the surface of the housing when compressed by the surface of the housing;
 wherein the two raised formations have different heights relative to a common plane defined by the housing;
 wherein a first taller raised formation has a width-to-height ratio that allows for rolling and/or folding of the first taller raised formation under a compressive force from the housing, the first taller raised formation being structured relative to the surface of the housing for movement towards a second shorter raised formation, and wherein the first taller raised formation moves towards the second shorter raised formation under the compressive force from the surface of the housing.

2. The filter of claim 1, wherein one raised formation of compressible material has a height in the range of approximately 1.25 mm to 10 mm, and wherein the second raised formation of compressible material has a height in the range of approximately 0.75 mm to 7 mm.

3. The filter of claim 1, wherein one raised formation of compressible material is approximately 0.25 mm to 5 mm taller than the second raised formation for sealing.

4. The filter of claim 1, wherein the first taller raised formation is asymmetrically formed.

5. The filter of claim 1, wherein a ratio of the width W(T) to the Height H(T) of the first taller raised formation is from 1:1 to 1:7.

6. The filter of claim 1, wherein a second shorter raised formation has a ratio of the width W(S) to height H(S) that is 2:1 up to 1:3 such that the shorter raised formation does not fold over under compressive forces from the housing.

7. The filter of claim 1, wherein the housing is structured to cause the first taller raised formation to roll toward a second shorter raised formation.

8. The filter of claim 1, wherein a first taller raised formation compresses 20-25% and a second shorter raised formation compresses 10-15%.

9. The filter of claim 8, wherein the second shorter raised formation is sized and structured to form a stop that limits and amount of compressive forces on the first taller raised formation by the housing.

10. The filter of claim 1, wherein the rolling and/or folding of the first taller raised formation creates an air gap between the two raised formations.

11. The filter of claim 1, wherein the filter body is formed as a flat panel.

12. The filter of claim 1, wherein the filter body is formed as a cylindrical filter.

13. A filter housing assembly having a sealing mechanism between a filter body and a surface of a housing, the assembly comprising:
a housing with inlet and outlet for fluid flow, the housing having a surface;
a filter body made of porous material;
a gasket located around a perimeter of the filter body, and
a seal formed on the gasket and positioned to engage the surface of the housing, the seal including two raised formations of compressible material having different heights relative to a plane, wherein the two raised formations each form a seal with the surface of the housing when compressed by the surface of the housing;
wherein a first taller raised formation has a width-to-height ratio that allows for rolling and/or folding of the first taller raised formation under a compressive force from the housing, the first taller raised formation being structured relative to the surface of the housing for movement towards a second shorter raised formation, and wherein the first taller raised formation moves towards the second shorter raised formation under the compressive force from the surface of the housing.

14. The filter housing assembly of claim 13, wherein one raised formation of compressible material has a height in the range of approximately 1.25 mm to 10 mm, and wherein the second raised formation of compressible material has a height in the range of approximately 0.75 mm to 7 mm.

15. The filter housing assembly of claim 13, wherein one raised formation of compressible material is approximately 0.25 mm to 5 mm taller than the second raised formation for sealing.

16. The filter housing assembly of claim 13, wherein the porous material is folded to create multiple pleats.

17. A filter for installation into a housing that has a surface that compresses a portion of the filter, the filter comprising:
a filter body made of porous material;
a gasket formed around the perimeter of the filter body; and
a seal formed on the gasket and positioned to engage the surface of the housing, the seal including two raised formations of compressible material having different sizes, wherein the two raised formations each form a seal with the surface of the housing when compressed by the surface of the housing;
wherein the two raised formations have different heights relative to a common plane defined by the housing;
wherein a first taller raised formation is located radially inwardly from a second shorter raised formation relative to the perimeter of the filter body.

18. The filter of claim 17, wherein the second shorter raised formation is sized and structured to form a stop that limits and amount of compressive forces on the first taller raised formation by the housing.

19. The filter of claim 17, wherein the first taller raised formation has a width-to-height ratio that allows for rolling and/or folding of the first taller raised formation under a compressive force from the housing, the first taller raised formation being structured relative to the surface of the housing for movement towards a second shorter raised formation, and wherein the first taller raised formation moves towards the second shorter raised formation under the compressive force from the surface of the housing.

* * * * *